(12) United States Patent
Tark et al.

(10) Patent No.: US 12,205,513 B2
(45) Date of Patent: Jan. 21, 2025

(54) POWER MANAGEMENT DEVICE FOR DRIVING DISPLAY PANEL

(71) Applicant: LX SEMICON CO., LTD., Daejeon (KR)

(72) Inventors: Jung Hyun Tark, Daejeon (KR); Hyung Sub Kim, Daejeon (KR); Su Jeong Na, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/499,967

(22) Filed: Nov. 1, 2023

(65) Prior Publication Data

US 2024/0144854 A1    May 2, 2024

(30) Foreign Application Priority Data

Nov. 1, 2022 (KR) .................. 10-2022-0143279

(51) Int. Cl.
*G09G 3/3208* (2016.01)
*G09G 3/20* (2006.01)

(52) U.S. Cl.
CPC ... *G09G 3/2092* (2013.01); *G09G 2310/0297* (2013.01); *G09G 2330/021* (2013.01)

(58) Field of Classification Search
CPC ......... G09G 3/2092; G09G 2310/0297; G09G 2330/021; G09G 3/3208; G09G 3/20
See application file for complete search history.

(56) References Cited

U.S. PATENT DOCUMENTS

| | | |
|---|---|---|
| 2008/0174285 A1 | 7/2008 | Morita |
| 2015/0268745 A1 | 9/2015 | Li et al. |
| 2016/0293106 A1* | 10/2016 | Seo .......................... G09G 3/20 |
| 2018/0307357 A1 | 10/2018 | Lee et al. |
| 2022/0199005 A1* | 6/2022 | Kim ..................... G09G 3/3208 |

OTHER PUBLICATIONS

European Search Report issued for European Patent Application No. 23207237.1 dated Nov. 28, 2023, 10 pages.

* cited by examiner

*Primary Examiner* — Abdul-Samad A Adediran
(74) *Attorney, Agent, or Firm* — ROTHWELL, FIGG, ERNST & MANBECK, P.C.

(57) ABSTRACT

Power management device for driving a display panel is disclosed. In order to achieve the above object, a power management device of operating a display panel may include a first buffer circuit configured to generate and output a first gamma reference voltage in a first section of a frame and generate and output a first touch driving voltage in a second section of the frame; and a second buffer circuit configured to generate and output a second gamma reference voltage in the first section and generate and output a second touch driving voltage in the second section.

20 Claims, 12 Drawing Sheets

POWER MANAGEMENT DEVICE FOR DRIVING DISPLAY PANEL

CROSS-REFERENCE TO RELATED APPLICATIONS

The present application claims the benefits of priority to Korean Patent Application No. 10-2022-0143279, filed on Nov. 1, 2022, the disclosure of which is incorporated herein by reference in its entirety.

TECHNICAL FIELD

The present disclosure relates to a power management device that provides power to devices that drive a display panel.

BACKGROUND

Multiple pixels may be arranged on the display panel. The brightness of pixels may be adjusted using a backlight and liquid crystal, and the brightness may be adjusted by adjusting the amount of power flowing to a self-light-emitting device such as an OLED (Organic Light Emitting Diode).

The display device may include a driving device that may adjust the brightness of each pixel. The driving device controls the degree of opening and closing of the liquid crystal or supplies it to self-luminous elements. The brightness of each pixel may be adjusted by adjusting the amount of power.

The driving device may supply a data voltage corresponding to the gray level value of each pixel to each pixel. In addition, each pixel may adjust the degree of opening and closing of the liquid crystal or the amount of power supplied to the self-light-emitting device according to the data voltage. In terms of supplying data voltage, the above-described driving device is also called a data driving device. Meanwhile, a driving transistor may be disposed in each pixel, and the data voltage may be supplied to the source terminal of the driving transistor. In this respect, the data driving device is also called a source driver. In addition, the data driving device may drive a plurality of pixels in one channel forming one vertical line. In this respect, the data driving device is also called a column driver.

The data driving device may drive one line per horizontal line at predetermined horizontal times. For example, the data driving device may drive the pixels of the first horizontal line during the first horizontal time and drive the pixels of the second horizontal line during the second horizontal time following the first horizontal time.

The data driving device may change the size of the data voltage supplied to the display panel according to the gray level value of each line pixel at one point in each horizontal time. For example, the data driving device supplies the first data voltage to the display panel during the first horizontal time, and then changes the first data voltage to the second data voltage at the start of the second horizontal time to supply the first data voltage to the display panel. The data driving device may use a digital-to-analog converter (DAC) to convert the gray level value of each pixel into a data voltage. The digital-to-analog converter selects and outputs one of a plurality of gamma voltages according to the gray level value, and the data driving device may generate a data voltage by amplifying the selected gamma voltage.

There is a difference between the gradation corresponding to physical brightness and the gradation corresponding to the brightness perceived by humans. Correcting this difference is called gamma conversion. When the data driving device generates a data voltage, gamma conversion may also be applied at the same time. For example, the data driving device may apply digital-analog conversion and gamma conversion at the same time by using the voltages supplied to the digital-analog converter as voltages to which gamma conversion has been applied. In this respect, the voltages supplied to the digital-to-analog converter are also called gamma voltages.

The display device may generate gamma reference voltages and supply the gamma reference voltages to some nodes of the resistor string to generate the gamma voltages. A power management device included in the display device may generate these gamma reference voltages.

Meanwhile, the display device may further include a touch panel disposed to overlap the display panel.

The touch panel may include a plurality of touch electrodes. When the touch panel adopts the mutual capacitance method, the touch panel may include TX touch electrodes arranged in one direction and RX touch electrodes arranged in a direction perpendicular to one direction. Also, when the touch panel adopts the self-capacitance method, the touch panel may include touch electrodes arranged in a matrix form.

In the mutual capacitance method, the intersection of one TX touch electrode and one RX touch electrode may form one touch cell, and in the self-capacitance method, one touch electrode may form one touch cell. A display device may generate touch coordinates for a plurality of touch cells disposed on a display panel by sensing capacitance formed in each touch cell.

The display device may sense the capacitance of each touch cell by transmitting a touch driving signal to the touch electrodes. A touch driving signal may be generated using a plurality of touch driving voltages, and a power management device included in the display device may generate these touch driving voltages.

The above-described gamma reference voltages and touch driving voltages are voltages that require little change in voltage. According to these characteristics, the power management device generates gamma reference voltages and touch driving voltages using additional circuits such as buffers. The size of the circuits is large and consumes a lot of power, so it is necessary to miniaturize and reduce the power consumption of the display device. It is becoming an obstacle.

DISCLOSURE OF THE INVENTION

Technical Problem

Against this background, the technical problem of this embodiment is, in one aspect, to provide a power management device suitable for miniaturization and low power consumption of a display device. In another aspect, the purpose of this embodiment is to provide a technology that may satisfy required voltage characteristics while reducing the number of additional circuits such as buffers in a power management device.

In light of this context, the objective of this embodiment is, in one respect, to furnish a power management device well-suited for downsizing and low power consumption of a display device. In another aspect, the aim of this embodiment is to offer a technology capable of meeting the necessary voltage characteristics while minimizing the usage of additional circuits such as buffers within a power management device.

Technical Solution

In order to achieve the above object, a power management device of operating a display panel may include a first buffer circuit configured to generate and output a first gamma reference voltage in a first section of a frame and generate and output a first touch driving voltage in a second section of the frame; and a second buffer circuit configured to generate and output a second gamma reference voltage in the first section and generate and output a second touch driving voltage in the second section.

Effect of the Invention

As described above, according to this embodiment, the display device may be miniaturized and reduce power consumption. And, according to this embodiment, the power management device included in the display device may be miniaturized and reduce power consumption. And, according to this embodiment, it is possible to satisfy the required voltage characteristics while reducing the number of additional circuits such as buffers in the power management device.

DETAILED DESCRIPTION OF THE INVENTION

Figure 1:
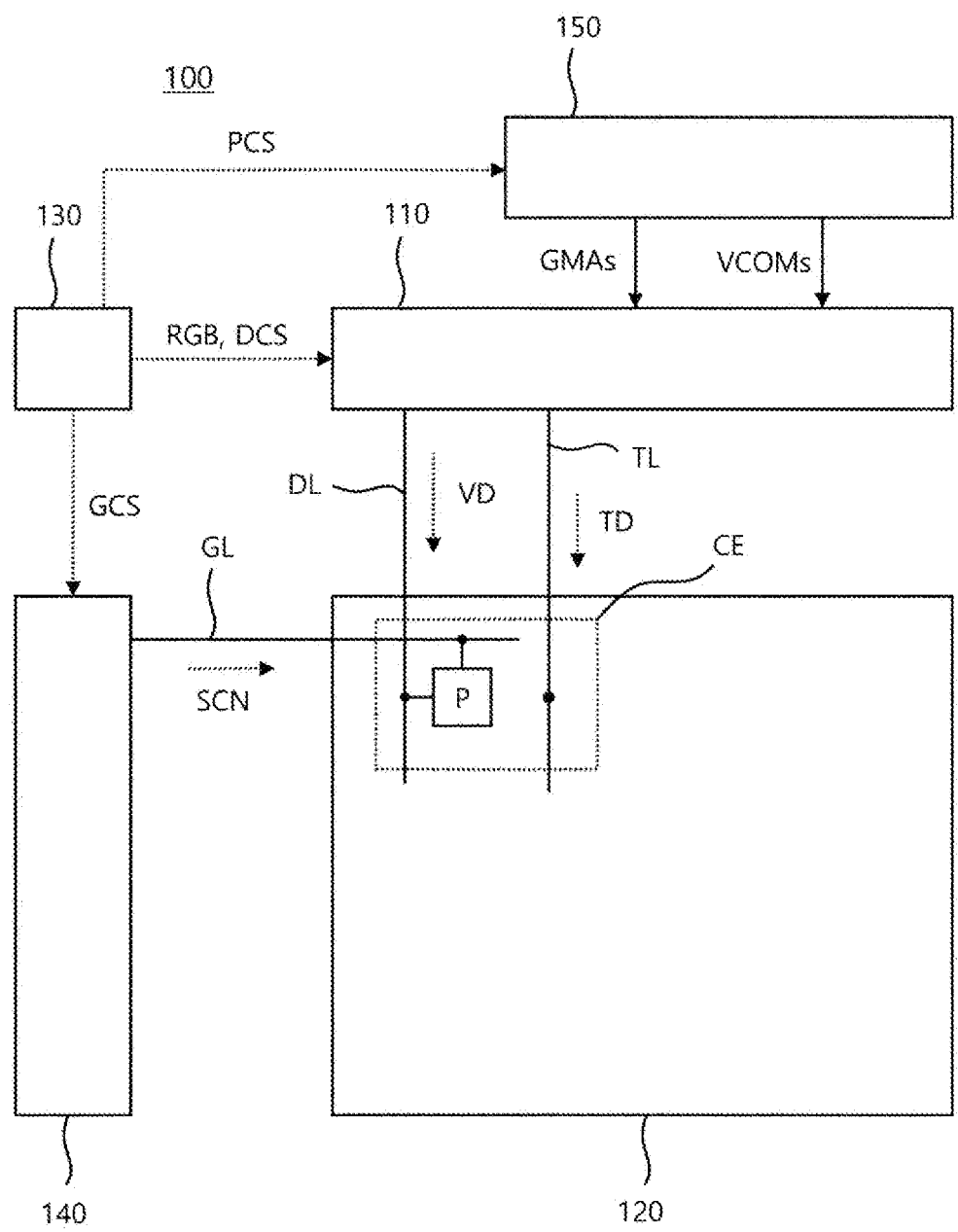
FIG. 1 is a configuration diagram of a display device according to an embodiment.

FIG. 1 is a configuration diagram of a display device according to an embodiment.

Referring to FIG. 1, the display device 100 may include a display panel 120, a data processing device 130, a gate driving device 140, a data driving device 110, and a power management device 150.

The display panel 120 may be a liquid crystal display (LCD) panel or a self-luminous device panel such as an organic light emitting diode (OLED) panel.

When the display panel 120 is a liquid crystal display panel, the display panel 120 may include a backlight, liquid crystal, and a common electrode, and a pixel electrode and a driving transistor may be disposed in each pixel. When a scan signal is supplied to the gate of the driving transistor, the driving transistor is turned on and the data voltage may be supplied to the pixel electrode. In addition, as an electric field is formed between the pixel electrode and the common electrode according to the data voltage, the alignment direction of the liquid crystal changes, and the degree of transmission of light supplied from the backlight changes accordingly, thereby adjusting the brightness of the pixel.

A plurality of data lines (DL) and a plurality of gate lines (GL) may be arranged in a matrix form on the display panel 120. The data line (DL) may be connected to the source terminal of the driving transistor of each pixel, and the gate line GL may be connected to the gate terminal of the driving transistor of each pixel. When the scan signal (SCN) is supplied to the gate line (GL), the driving transistor is turned on and the data voltage (VD) supplied through the data line (DL) may be transmitted to the pixel electrode.

A parasitic capacitor may be formed in the data line DL. The parasitic capacitor may be formed between the data line (DL) and the common electrode or between the data line (DL) and the pixel electrode. From the perspective of the data driving device 110 that supplies the data voltage (VD), the parasitic capacitor may be recognized as a load. The larger the capacity of the parasitic capacitor, the more power the data driving device 110 must supply to the data line DL.

The display panel 120 may be a self-light emitting device panel such as an OLED panel. In addition to OLED panels, self-light-emitting device panels may also use other types of self-light-emitting devices, such as micro-LED panels.

A scan transistor, a driving transistor, and an OLED may be placed in each pixel of an OLED panel. When a scan signal (SCN) is supplied to the gate of the scan transistor, the scan transistor is turned on and the data voltage (VD) may be supplied to the driving transistor through the scan transistor. In an OLED panel, the data voltage (VD) may be supplied to the gate of the driving transistor. The size of the conduction current of the driving transistor is determined according to the size of the data voltage (VD), and the brightness of the OLED connected to the driving transistor may be adjusted according to the size of the conduction current of the driving transistor.

A plurality of data lines (DL) and a plurality of gate lines (GL) may be arranged in a matrix form on the display panel 120. The data line DL may be connected to the source terminal of the scan transistor of each pixel, and the gate line GL may be connected to the gate terminal of the source transistor of each pixel. When the scan signal (SCN) is supplied to the gate line (GL), the scan transistor is turned on and the data voltage (VD) supplied through the data line (DL) may be transmitted to the driving transistor.

A parasitic capacitor may be formed in the data line (DL). The parasitic capacitor may be formed between the data line (DL) and the cathode electrode of the OLED, or between the data line (DL) and the anode electrode of the OLED. From the perspective of the data driving device 110 that supplies the data voltage (VD), the parasitic capacitor may be recognized as a load. The larger the capacity of the parasitic capacitor, the more power the data driving device 110 must supply to the data line (DL).

The data processing device 130 may receive image data from an external device—for example, a host or a device called an application processor (AP). In addition, image data in the format of an external device may be converted into image data (RGB) in a format that the data driving device 110 may process. And, the data processing device 130 may transmit the converted image data (RGB) to the data driving device 110.

Image data (RGB) may include pixel data representing gray level values for each pixel (P). Pixel data for one pixel (P) may be, for example, data having 8 bits and may represent gray level values from 0 to 255. The data processing device 130 may generate pixel data for each pixel, include the pixel data in image data (RGB), and transmit it to the data driving device 110.

The data processing device 130 may transmit a control signal to devices involved in driving the display panel—for example, the data driving device 110, the gate driving device 140, and the power management device 150. The data processing device 130 may transmit a data control signal (DCS) to the data driving device 110, a gate control signal (GCS) to the gate driving device 140, and the power control signal (PCS) to the power management device 150.

Control signals (DCS, GCS, PCS) may include setting information for each device. For example, the data processing device 130 may receive setting information from an external device, check the setting information for each device, and then transmit the setting information by including it in the corresponding control signal (DCS or GCS).

Control signals (DCS, GCS, PCS) may include timing signals for controlling each device. The timing signal may be, for example, a vertical synchronization signal (Vsync), a horizontal synchronization signal (Hsync), etc. The data driving device 110, gate driving device 140, or power management device 150 may distinguish frames and each horizontal time according to timing signals. In terms of controlling the timing of each device, the data processing device 130 may be also referred to as a timing controller.

The gate driving device 140 may supply a scan signal (SCN) to the pixels (P) disposed on the display panel 120. Then, pixels to which a scan signal (SCN) indicating turn-on is supplied may be selected, and a data voltage (VD) may be supplied to the selected pixels.

The gate driving device 140 may supply a scan signal (SCN) through the gate line (GL). A plurality of gate lines GL may be disposed on the display panel 120. Additionally, each gate line (GL) may be connected to pixels (P) arranged in a row in one direction, for example, the horizontal direction. The gate driving device 140 may supply a scan signal (SCN) indicating turn-on to one of the plurality of gate lines (GL), and pixels (P) connected to the gate line (GL) may be selected. The gate driving device 140 may supply a scan signal (SCN) that indicates turn-on while changing the gate line (GL) every horizontal time.

The data driving device 110 may drive pixels (P) disposed on the display panel 120.

The data driving device 110 may receive image data (RGB) from the data processing device 130. Then, the data driving device 110 may check the pixel data for each pixel (P) included in the image data (RGB), generate a data voltage (VD) corresponding to the pixel data, and supply the generated data voltage to each pixel (P).

Pixel data may represent a gray level value for each pixel (P). The data driving device 110 may generate a data voltage (VD) to correspond to the gray level value.

Pixel data may be stored in the latch circuit of the data driving device 110 and output in the form of a digital signal. Additionally, the data driving device 110 may convert a digital signal into an analog voltage using gamma voltages.

There is a difference between the gradation corresponding to physical brightness and the gradation corresponding to the brightness perceived by humans. Correcting this difference may be referred to as a gamma conversion. When converting a digital signal to an analog voltage, the data driving device 110 may also apply gamma conversion at the same time. For example, the data driving device 110 may apply digital-to-analog conversion and gamma conversion at the same time by using the voltages used for digital-to-analog conversion as voltages to which gamma conversion has been applied—gamma voltages.

The analog voltage may not be suitable for driving the pixel (P) due to its low power level. Therefore, the data driving device 110 may amplify the analog voltage to generate the data voltage (VD), and supply the data voltage VD with a relatively high-power level to the pixel P.

Meanwhile, touch electrodes (CE) may be built into the display panel 120. A panel with built-in touch electrodes (CE) may be referred to as an in-cell panel, but not limited thereto.

When the display panel 120 in which the touch electrodes (CE) are built-in is a liquid crystal display panel, the touch electrodes (CE) may be a common electrode. When the display panel 120 in which the touch electrodes (CE) are built-in is an OLED panel, the touch electrodes (CE) may be cathode electrodes. Hereinafter, for convenience of explanation, the description will focus on an example where the display panel 120 is a liquid crystal display panel, but not limited to this.

The display device 100 may include a readout circuit for driving the touch electrode (CE) and sensing capacitance formed in the touch cell. The readout circuit may be implemented as a separate device—for example, an integrated circuit—or may be implemented as built into the data driving device 110. In this example, because the data driving device 110 may perform both the function as a source driver and a readout circuit, the data driving device 110 may be also referred to as a Source Readout-Integrated Circuit (SR-IC).

The data driving device 110 may transmit a touch driving signal (TD) to the touch electrode (CE) through the touch driving line (TL). Additionally, the data driving device 110 may sense the capacitance of the touch cell by sensing the response of the touch cell to the touch drive signal (TD). Here, the touch cell may be a touch electrode (CE). Alternatively, if the display device adopts a mutual capacitance type touch, a part where one touch electrode (CE) intersects another touch electrode may be a touch cell. When the touch electrode (CE) through which the touch drive signal (TD) is transmitted is a touch cell, the data drive device 110 senses the capacitance of the touch cell using the response of the corresponding touch electrode to the touch drive signal (TD). In the mutual capacitance method, the capacitance of the touch cell may be sensed using the response of a touch electrode other than the touch electrode (CE) through which the touch drive signal (TD) is transmitted.

The power management device 150 may supply voltages required for the operation of devices used to drive the display panel 120—so-called display driving devices—to each device.

The power management device 150 may supply voltages necessary for operating circuits to the data processing device 130. In addition, the power management device 150 may supply voltages necessary for operating circuits to the gate driving device 140. In particular, the gate driving device 140 may use voltages with high power levels—for example, gate high voltage and gate low voltage—and the power management device 150 may separately generate these voltages to control the gate driving device 140.

The power management device 150 may supply voltages necessary for operating circuits to the data driving device 110. The power management device 150 may supply the gamma reference voltages (GMAs) necessary to generate the data voltage (VD) to the data driving device 110, and the touch driving voltages (VCOMs) necessary to generate the touch driving signal (TD). Since the voltage levels of these gamma reference voltages (GMAs) and touch driving voltages (VCOMs) must be managed stably, and the power level used is relatively high, the power management device 150 may include additional circuits for adapting characteristics.

Figure 2:
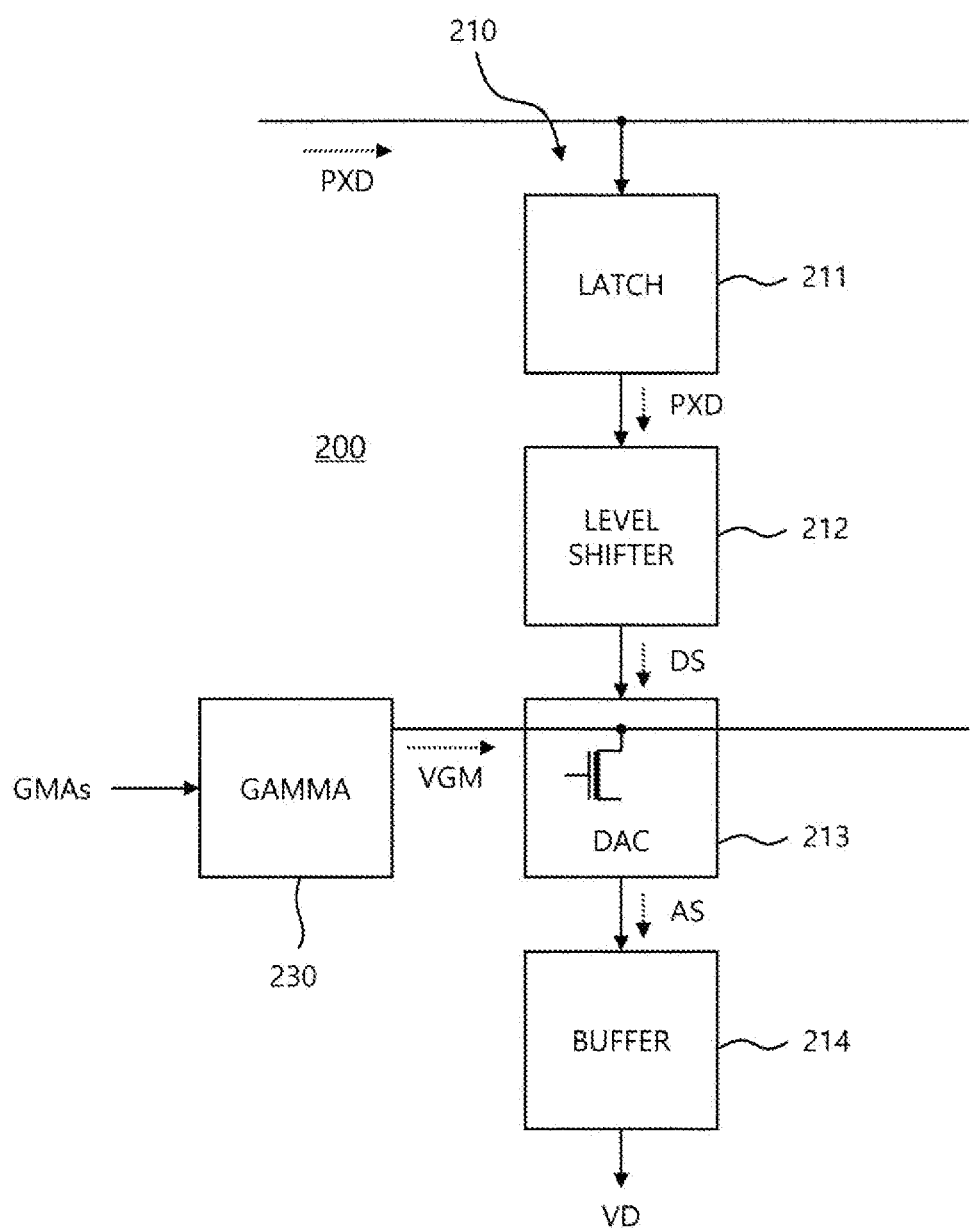
FIG. 2 is a configuration diagram of the data driving device according to an embodiment.

FIG. 2 is a configuration diagram of the data driving device according to an embodiment.

Referring to FIG. 2, the data driving device 110 may include a channel circuit 210, a gamma voltage generation circuit 230, etc.

The channel circuit 210 may include a latch circuit 211, a level shifter 212, a digital-to-analog converter (DAC) 213, and an output buffer circuit 214. The channel circuit 210 may receive pixel data (PXD) corresponding to gray level values of the pixels to generate data voltage (VD), and supply the data voltage (VD) to the data line connected to the pixel.

The latch circuit 211 may sequentially store pixel data (PXD) received through a data bus line.

The latch circuit 211 may have two latches inside. The first latch may store pixel data to be output at the next horizontal time. The second latch may store pixel data to be output at the current horizontal time. When the next horizontal time comes, pixel data to be output at the next horizontal time may be stored in the first latch, and the pixel data stored in the first latch may be moved to the second latch and stored.

The output timing of the latch circuit 211 may be determined according to the latch output signal generated at each horizontal time. The latch output signal may be synchronized with the horizontal synchronization signal. Alternatively, the latch output signal may be a signal that has a different phase from the horizontal synchronization signal but has the same cycle length.

The latch circuit 211 may transfer the pixel data (PXD) stored in the latch circuit 211 to the level shifter 212 according to the latch output signal.

The level shifter 212 may convert pixel data (PXD) into a digital signal (DS). The level shifter 212 may increase the signal level while converting the pixel data (PXD) into a digital signal (DS).

Pixel data (PXD) may be a signal with a low voltage or power level. The level shifter 212 may convert pixel data (PXD) into a digital signal (DS) with a high voltage or power level.

The DAC 213 may receive the digital signal (DS) to drive the gates of the internal switches. Additionally, the DAC 213 may convert the digital signal (DS) into an analog voltage (AS) through gate driving of the switches.

DAC 213 may include a plurality of switches. The switches may selectively connect one of a plurality of gamma voltage lines supplied with a plurality of gamma voltages (VGM) to the output according to the on-off state. The voltage formed on one selected gamma voltage line may be an analog voltage (AS). The digital signal (DS) may change the on-off state of the switches while being supplied to the gates of the switches.

A digital signal (DS) may be supplied to drive the gates of the switches. The digital signal (DS) may be output by the level shifter 212, and from this perspective, the gate load of the switches may be part of the output load of the level shifter 212.

The data driving device 110 may include a gamma voltage generation circuit 230 that supplies gamma voltages (VGM) to the DAC 213.

The channel circuit 210 may include an output buffer circuit 214 disposed between the output of the DAC 213 and the pixel.

The output buffer circuit 214 may amplify the output of the DAC 213 and supply the amplified output to a data line connected to the pixel. The output buffer circuit 214 may amplify the analog voltage (AS) to generate a data voltage (VD) and supply the data voltage (VD) to the data line.

The output buffer circuit 214 may include a differential amplifier for amplifying the analog voltage (AS) to the data voltage (VD).

The differential amplifier may include a Rail-to-Rail Class-AB type amplifier. The output buffer circuit 214 may generate a data voltage (VD) by amplifying the analog voltage (AS) using the differential amplifier.

The input and output of the differential amplifier may be connected with a buffer structure. For example, the output terminal of the differential amplifier may be connected to the negative input terminal of the differential amplifier. And, the analog voltage (AS) may be supplied to the plus input terminal of the differential amplifier.

The gamma voltage generation circuit 230 may receive gamma reference voltages (GMAs) and generate gamma voltages (VGM) using the gamma reference voltages (GMAs).

Figure 3:
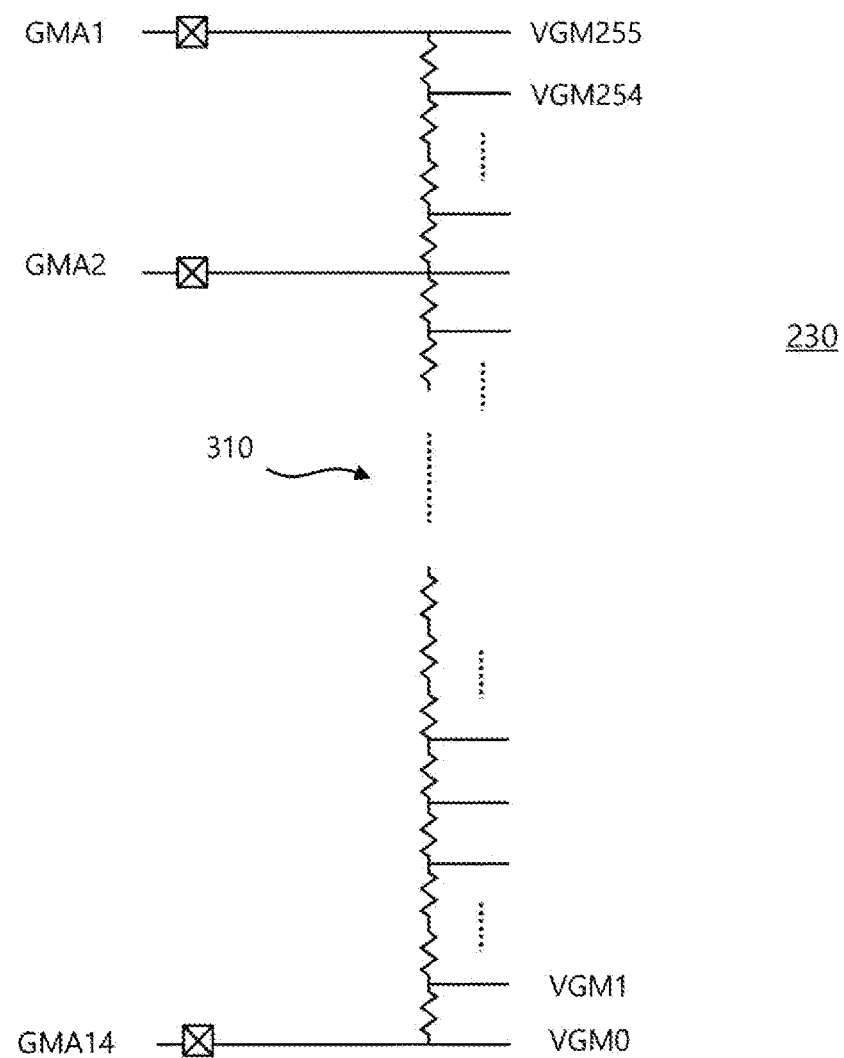
FIG. 3 is a configuration diagram of a gamma voltage generation circuit according to an embodiment.

FIG. 3 is a configuration diagram of a gamma voltage generation circuit according to an embodiment.

Referring to FIG. 3, the gamma voltage generation circuit 230 may include a resistor string 310.

A plurality of nodes may be formed in the resistor string 310. Gamma voltages (VGM0 to VGM255) may be formed at the plurality of nodes. And, gamma voltages (VGM0 to VGM255) may be transferred to DAC.

In order to stabilize the voltage level of the gamma voltages (VGM0 to VGM255) or to increase the power level of the gamma voltages (VGM0 to VGM255), the gamma reference voltages (GMA1 to GMA14) may be transferred to some of nodes of the resistor string 310. For example, fourteen gamma reference voltages (GMA1 to GMA14) may be supplied to the resistor string 310, and each gamma reference voltage (GMA1 to GMA14) may be supplied so that 10 to 20 nodes may be formed between adjacent gamma reference voltages. The interval of arrangement of gamma reference voltages (GMA1 to GMA14) may be determined.

Each of the gamma reference voltages (GMA1 to GMA14) may have different voltage level. For example, in FIG. 3, the voltage level of the voltage corresponding to reference number GMA1 may be the highest, and the voltage level of the voltage corresponding to GMA14 may be the lowest. The gamma reference voltage (GMA1) with the highest voltage level may be a plus voltage, and the gamma reference voltage (GMA14) with the lowest voltage level may be a minus voltage.

Figure 4:
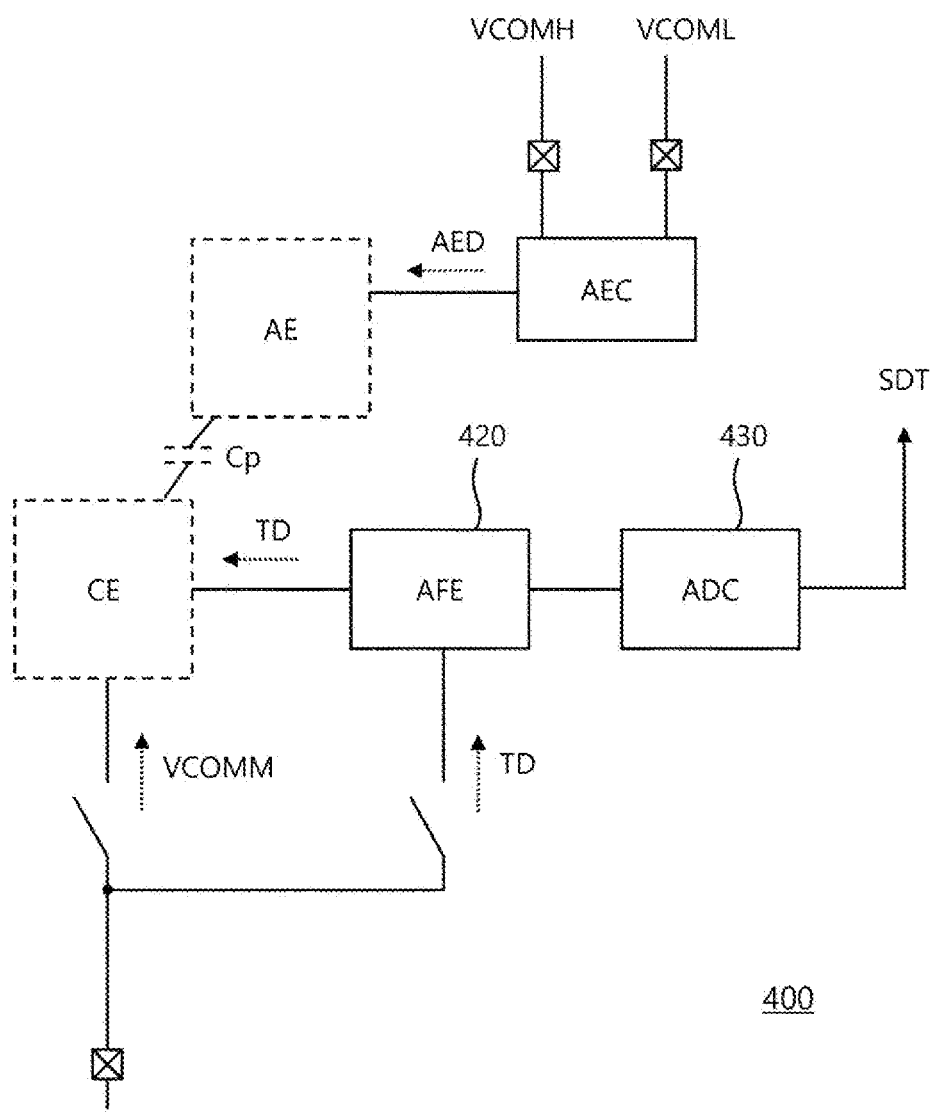
FIG. 4 is a readout circuit configuration diagram of a data driving device according to an embodiment.

FIG. 4 is a readout circuit configuration diagram of a data driving device according to an embodiment.

In FIG. 4, for convenience of explanation, a touch electrode (CE), a peripheral electrode (AE), and a parasitic capacitor (Cp) formed on the display panel are shown.

Referring to FIG. 4, the readout circuit 400 may include an analog frontend circuit 420, an analog-to-digital converter 430, and a peripheral electrode driving circuit (AEC).

In a display panel, a common electrode may be used as a touch electrode (CE). One electrode may be used for two purposes; so, the display device may drive the common electrode by dividing the time.

For example, the readout circuit 400 may divide one image frame section into a display driving section and a touch driving section and supply a common voltage (VCOMM) from the display driving section to the common electrode. Also, the readout circuit 400 may supply a touch drive signal (TD) to the common electrode in the touch drive section.

The touch driving signal (TD) may be supplied to the common electrode by the analog frontend circuit 420. The analog frontend circuit 420 may convert the response signal of the touch cell to the touch drive signal (TD) into a signal that may be recognized by the analog-to-digital converter 430 and then transmit it to the analog-to-digital converter 430.

Additionally, the analog-to-digital converter 430 may convert the output signal of the analog frontend circuit 420 into touch raw data (SDT) and then transmit it to an external device. An external device—for example, a touch data processing device—may apply a coordinate recognition algorithm to touch raw data (SDT) to extract touch coordinates and transmit touch data including the touch coordinates to the host device.

Meanwhile, a parasitic capacitor (Cp) may be formed between the touch electrode (CE) and the peripheral electrode (AE). For example, the peripheral electrode (AE) may be a gate line or a data line. And, the peripheral electrode (AE) may be a touch electrode disposed around the touch electrode (CE) to which the touch driving signal (TD) is supplied.

The parasitic capacitor (Cp) may be a factor that reduces touch performance. To minimize the effect of the parasitic capacitor (Cp), the peripheral electrode driving circuit (AEC) may supply the touch auxiliary signal (AED) to the peripheral electrode (AE). The touch auxiliary signal (AED) may be a signal with the same or similar period and phase as the touch driving signal (TD). When a signal with the same period and phase is supplied to both ends of the parasitic capacitor (Cp), the same effect occurs as if a direct current voltage is supplied to both ends of the parasitic capacitor (Cp), so the influence of the parasitic capacitor (Cp) may be eliminated. For that, the peripheral electrode driving circuit (AEC) may supply a touch auxiliary signal (AED) to the peripheral electrode (AE).

The touch driving signal (TD) may have a form in which the touch driving high voltage (VCOMH) and the touch driving low voltage (VCOML) alternate. The peripheral electrode driving circuit (AEC) may receive the touch driving high voltage (VCOMH) and the touch driving low voltage (VCOML) to generate a touch auxiliary signal (AED) similar to the touch driving signal (TD), and the touch driving high voltage (VCOMH) and a touch auxiliary signal (AED) may be generated using touch driving low voltage (VCOML).

Meanwhile, the gamma reference voltages described with reference to FIG. 3 and the touch driving voltages described with reference to FIG. 4 may need to maintain stable voltage levels and the power level may need to be relatively high. In order to match these voltage characteristics, the power management device may generate gamma reference voltages and touch driving voltages using buffers. In this case, to minimize the area occupied by the buffers and the amount of power consumed by the buffers, the power management device may generate gamma reference voltages and touch driving voltages using shared buffers.

Figure 5A:
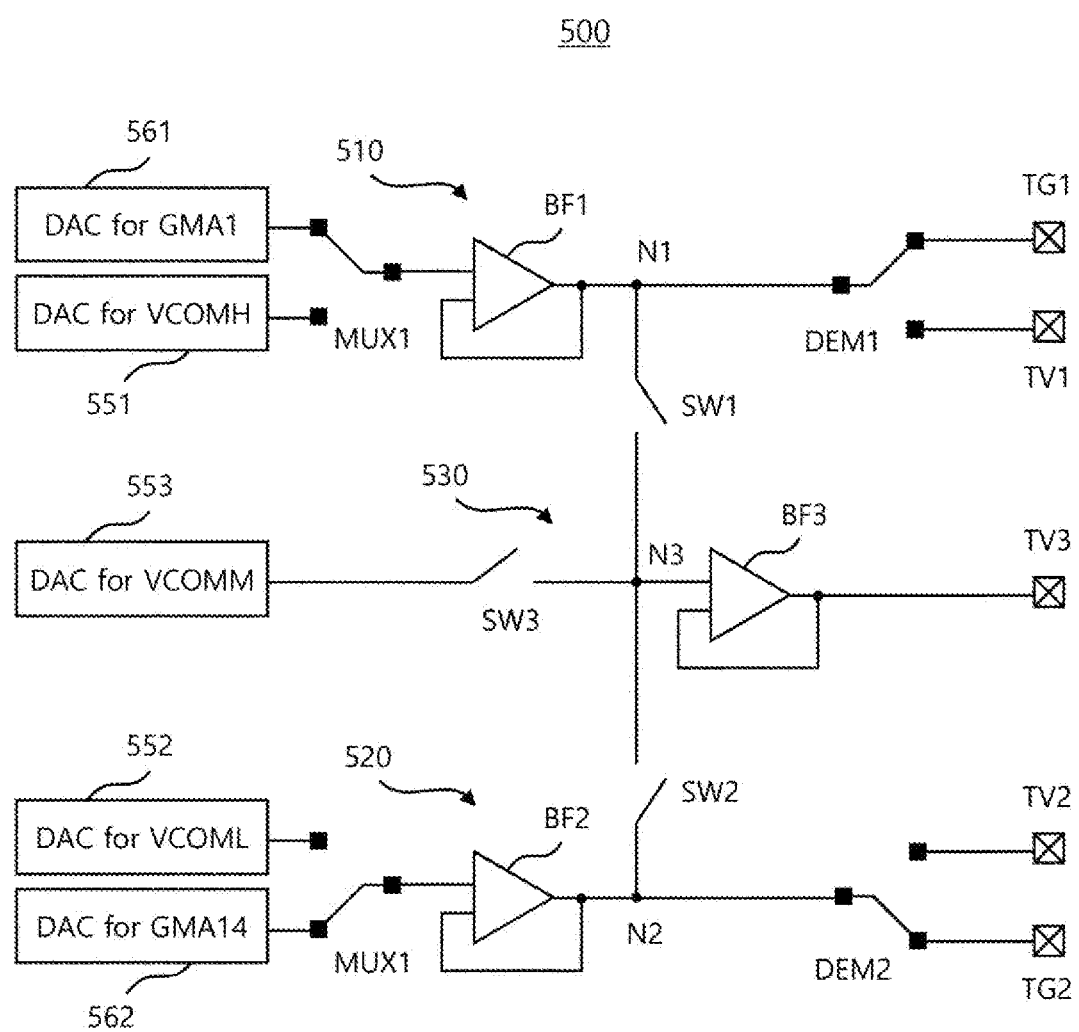
FIGS. 5A and 5B are configuration diagrams of a power management device according to a first example of an embodiment.
Figure 5B:
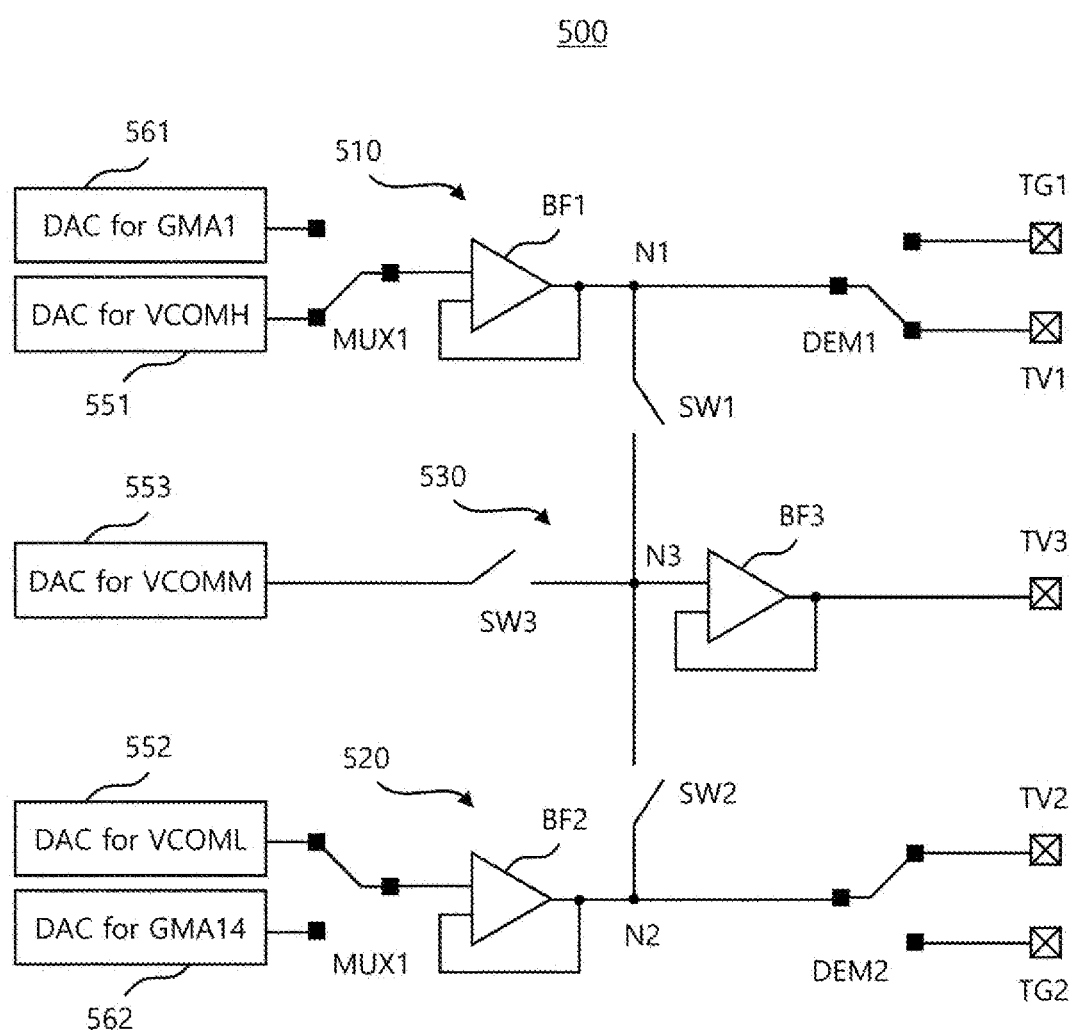

FIGS. 5A and 5B are configuration diagrams of a power management device according to a first example of an embodiment.

Referring to FIGS. 5A and 5B, the power management device 500 may include a gamma reference voltage supply circuit and a touch driving voltage supply circuit.

The gamma reference voltage supply circuit may be a circuit that generates gamma reference voltages (GMA1 to GMA14) for generating gamma voltages.

The gamma reference voltage supply circuit may include gamma reference voltage DACs 561 and 562 and buffers BF1 and BF2.

Each of the gamma reference voltage DACs 561 and 562 may convert a digital signal indicating a gamma reference voltage level into an analog voltage signal. For example, the first gamma reference voltage DAC 561 may convert a digital signal indicating the voltage level of the first gamma reference voltage into a first gamma reference voltage signal. Additionally, the second gamma reference voltage DAC 562 may convert a digital signal indicating the voltage level of the second gamma reference voltage into a second gamma reference voltage signal.

Additionally, the buffers BF1 and BF2 may amplify the gamma reference voltage signals output from the gamma reference voltage DACs 561 and 562 to generate gamma reference voltages GMA1 to GMA14. For example, the first buffer (BF1) may amplify the first gamma reference voltage signal to generate the first gamma reference voltage (GMA1), and the second buffer (BF2) may amplify the second gamma reference voltage signal to generate the second gamma reference voltage (GMA14).

The touch driving voltage supply circuit may be a circuit that generates touch driving voltages (VCOMH, VCOML, VCOMM) for touch driving.

The touch driving voltage supply circuit may include touch driving voltage DACs 551, 552, and 553 and buffers BF1, BF2, and BF3.

Each of the touch driving voltage DACs 551, 552, and 553 may convert a digital signal indicating a touch driving voltage level into an analog voltage signal. For example, the first touch driving voltage DAC 551 may convert a digital signal indicating the voltage level of the first touch driving voltage into a first touch driving voltage signal. Additionally, the second touch driving voltage DAC 552 may convert a digital signal indicating the voltage level of the second touch driving voltage into a second touch driving voltage signal, and the third touch driving voltage DAC 553 may convert the digital signal indicating the voltage level of the third touch driving voltage into a third touch driving voltage signal.

In addition, the buffers (BF1, BF2, BF3) may amplify the touch driving voltage signals output from the touch driving voltage DACs (551, 552, and 553) to generate touch driving voltages (VCOMH, VCOML, VCOMM). For example, the first buffer BF1 may amplify the first touch driving voltage signal to generate the first touch driving voltage (VCOMH), and the second buffer BF2 may amplify the second touch driving voltage signal to generate the second touch driving voltage (VCOML), and the third buffer (BF3) may amplify the third touch driving voltage signal to generate a third touch driving voltage (VCOMM).

Meanwhile, some buffers used in the gamma reference voltage supply circuit and some buffers used in the touch driving voltage supply circuit may be shared.

For example, the first buffer BF1 may amplify the first gamma reference voltage signal to generate the first gamma reference voltage (GMA1), and amplify the first touch driving voltage signal to generate the first touch driving voltage (VCOMH). Additionally, the second buffer (BF2) may amplify the second gamma reference voltage signal to generate a second gamma reference voltage (GMA2) and amplify the second touch driving voltage signal to generate a second touch driving voltage (VCOML).

The gamma reference voltage supply circuit and the touch driving voltage supply circuit may share the buffers (BF1 and BF2) by dividing the time.

The gamma reference voltage supply circuit may generate the first gamma reference voltage (GMA1) and the second gamma reference voltage (GMA14) using the buffers (BF1, BF2) shared in the display driving section. The touch driving voltage supply circuit may generate the first touch driving voltage (VCOMH) and the second touch driving voltage (VCOML) using the buffers (BF1, BF2) shared in the touch driving section.

The first gamma reference voltage (GMA1) generated by the first buffer (BF1) and the first touch driving voltage (VCOMH) may have similar voltage levels. For example, the first gamma reference voltage (GMA1) and the first touch driving voltage (VCOMH) are plus voltages, and the first gamma reference voltage (GMA1) may have the highest voltage level among the gamma reference voltages (GMA1 to GMA14). And, the first touch driving voltage (VCOMH) may have the highest voltage level among the touch driving voltages (VCOMH, VCOML, and VCOMM).

The second gamma reference voltage (GMA14) and the second touch driving voltage (VCOML) generated by the second buffer BF2 may have similar voltage levels. For example, the second gamma reference voltage (GMA14) and the second touch driving voltage (VCOML) are minus voltages, and the second gamma reference voltage (GMA2) may have the lowest voltage level among the gamma reference voltages (GMA1 to GMA14). And, the second touch driving voltage (VCOML) may have the lowest voltage level among the touch driving voltages (VCOMH, VCOML, and VCOMM).

The first gamma reference voltage (GMA1) may have a higher voltage level than the second gamma reference voltage (GMA14), and the first touch driving voltage (VCOMH) may have a higher voltage level than the second touch driving voltage (VCOML).

The power management device 500 may include a plurality of multiplexers (MUX1, MUX2) and a plurality of demultiplexers (DEM1, DEM2).

The first buffer (BF1) may amplify and output the input signal. The first multiplexer (MUX1) may selectively transmit one of the first gamma reference voltage signal output from the first gamma reference voltage DAC 561 and the first touch driving voltage DAC 551 as an input signal of the first buffer (BF1).

The second buffer (BF2) may amplify and output the input signal. The second multiplexer (MUX2) may selectively transmit one of the second gamma reference voltage signal output from the second gamma reference voltage DAC 562 and the second touch driving voltage DAC 552 as an input signal of the second buffer (BF2).

The first demultiplexer (DEM1) may selectively supply the output voltage of the first buffer (BF1) to one of the first gamma reference voltage output terminal (TG1) and the first touch driving voltage output terminal (TV1).

Additionally, the second demultiplexer (DEM2) may selectively supply the output voltage of the second buffer (BF2) to one of the second gamma reference voltage output terminal (TG2) and the second touch driving voltage output terminal (TV2).

The power management device 500 may distinguish between a display driving section and a touch driving section according to a sync signal that has the same cycle as the image frame. And, a plurality of multiplexers (MUX1, MUX2) and a plurality of demultiplexers (DEM1, DEM2) may operate according to this sync signal.

FIG. 5A is a diagram illustrating the connection status of the multiplexers (MUX1, MUX2) and demultiplexers (DEM1, DEM2) in the display driving section.

In the display section, the first multiplexer (MUX1) may transmit the first gamma reference voltage signal to the first buffer (BF1), and the first demultiplexer (DEM1) may transmit the first gamma reference voltage (GMA1) output from the first buffer (BF1) to the first gamma reference voltage output terminal (TG1). At this time, the first touch driving voltage output terminal (TV1) connected to the first demultiplexer (DEM1) may be floating. And, in the display section, the second multiplexer (MUX2) may transmit the second gamma reference voltage signal to the second buffer (BF2), and the second demultiplexer (DEM2) may transmit the second gamma reference voltage (GMA14) output from the second buffer (BF2) to the second gamma reference voltage output terminal (TG2). At this time, the second touch driving voltage output terminal (TV2) connected to the second demultiplexer (DEM2) may be floating.

FIG. 5B is a diagram illustrating the connection status of the multiplexers (MUX1, MUX2) and demultiplexers (DEM1, DEM2) in the touch driving section.

In the touch driving section, the first multiplexer (MUX1) may transmit the first touch driving voltage signal to the first buffer (BF1), and the first demultiplexer (DEM1) may transmit the first touch driving voltage signal (VCOMH) output from the first buffer (BF1) to the first touch driving voltage output terminal (TV1). At this time, the first gamma reference voltage output terminal (TG1) connected to the first demultiplexer (DEM1) may be floating. And, in the touch driving section, the second multiplexer (MUX2) may transmit the second touch driving voltage signal to the second buffer (BF2), and the second demultiplexer (DEM2) may transmit the second touch driving voltage signal (VCOML) output from the second buffer (BF2) to the second touch driving voltage output terminal (TV2). At this time, the second gamma reference voltage output terminal (TG2) connected to the second demultiplexer (DEM2) may be floating.

The touch driving signal may have a form in which the first touch driving voltage (VCOMH) and the second touch driving voltage (VCOML) alternate. In order to generate such a touch drive signal, the output node (N1) of the first buffer (BF1) and the output node (N2) of the second buffer (BF2) may be connected to the third node (N3) through the switches SW1 and SW2. For example, the output node (N1) of the first buffer (BF1) may be connected to the third node (N3) through the first switch (SW1), and the output node (N2) of the second buffer (BF2) may be connected to the third node (N3) through the switch (SW2).

The first switch (SW1) may transfer the first touch driving voltage (VCOMH) formed at the output node (N1) of the first buffer (BF1) to the third node (N3) in response to the Pulse Width Modulation (PWM) signal in the touch driving section. And, the second switch (SW2) may transfer the second touch driving voltage (VCOML) formed at the output node (N2) of the second buffer (BF2) to the third node (N3) in response to the inversion signal of the PWM signal in the touch driving section. And, the touch driving signal formed at the third node (N3) may be output to the third touch driving voltage output terminal (TV3) directly or through the third buffer (BF3).

In the display driving section, both the first switch (SW1) and the second switch (SW2) may be turned off so that the touch driving signal may not be generated. And the third switch (SW3) may be turned on and output a common voltage (VCOMM) for driving a common electrode to the third touch driving voltage output terminal (TV3).

The third buffer BF3 may be disposed between the third node (N3) and the third touch driving voltage output terminal (TV3). According to this arrangement, the third buffer (BF3) may amplify the common voltage signal in the display driving section to generate a common voltage (VCOMM) and output it to the third touch driving voltage output terminal (TV3), and in the touch driving section, the first touch driving voltage (VCOMH) and the second touch driving voltage (VCOML) may be amplified and output it to the third touch driving voltage output terminal (TV3).

Meanwhile, the power management device according to one embodiment may be explained in view of a buffer circuit.

Referring again to FIGS. 5A and 5B, the power management device 500 may include a plurality of buffer circuits 510, 520, and 530.

The first buffer circuit 510 may include a first touch driving voltage DAC 551, a first gamma reference voltage DAC 561, a first multiplexer (MUX1), a first buffer (BF1), and a first demultiplexer (DEM1).

The first multiplexer (MUX1) may transmit the first gamma reference voltage signal generated by the first gamma reference voltage DAC (561) to the first buffer (BF1) in the display driving section. Additionally, the first buffer (BF1) may generate the first gamma reference voltage (GMA1) by amplifying the first gamma reference voltage signal. And, in the display driving section, the first demultiplexer (DEM1) may output the first gamma reference voltage (GMA1) to the first gamma reference voltage output terminal (TG1) and float the first touch driving voltage output terminal (TV1).

And, in the touch driving section, the first multiplexer (MUX1) may transmit the first touch driving voltage signal generated by the first touch driving voltage DAC (551) to the first buffer (BF1). Additionally, the first buffer (BF1) may generate the first touch driving voltage (VCOMH) by amplifying the first touch driving voltage signal. And, in the touch driving section, the first demultiplexer (DEM1) may output the first touch driving voltage (VCOMH) to the first touch driving voltage output terminal (TV1) and float the first gamma reference voltage output terminal (TG1).

The second buffer circuit 520 may include a second touch driving voltage DAC 552, a second gamma reference voltage DAC 562, a second multiplexer (MUX2), a second buffer (BF2), and a second demultiplexer (DEM2).

The second multiplexer (MUX2) may transmit the second gamma reference voltage signal generated by the second gamma reference voltage DAC (562) to the second buffer (BF2) in the display driving section. Additionally, the second buffer (BF2) may amplify the second gamma reference voltage signal to generate the second gamma reference voltage (GMA14). And, in the display driving section, the second demultiplexer (DEM2) may output the second gamma reference voltage (GMA14) to the second gamma reference voltage output terminal (TG2) and float the second touch driving voltage output terminal (TV2).

And, in the touch driving section, the second multiplexer (MUX2) may transmit the second touch driving voltage signal generated by the second touch driving voltage DAC 552 to the second buffer (BF2). Additionally, the second buffer (BF2) may amplify the second touch driving voltage signal to generate the second touch driving voltage VCOML. And, in the touch driving section, the second demultiplexer (DEM2) may output the second touch driving voltage (VCOML) to the second touch driving voltage output terminal (TV2) and float the second gamma reference voltage output terminal (TG2).

The third buffer circuit 530 may include a third touch driving voltage DAC 553 and a third buffer BF3.

In the display driving section, the third buffer (BF3) may amplify the common voltage signal output from the third touch driving voltage DAC 553 to generate a common voltage (VCOMM) and connect the common voltage (VCOMM) to the third touch driving voltage output terminal (TV3).

The third buffer circuit 530 may further include switches (SW1, SW2, and SW3). The first switch (SW1) may control the connection of the output node (N1) of the first buffer (BF1) and the input node (N3) of the third buffer (BF3). The second switch (SW2) may control the connection of the output node (N2) of the second buffer (BF2) and the input node (N3) of the third buffer (BF3). The third switch (SW3) may control the connection between the output of the third touch driving voltage DAC (553) and the input node (N3) of the third buffer (BF3).

In the display driving section, the third switch (SW3) is turned on and the common voltage (VCOMM) may be output to the third touch driving voltage output terminal (TV3) through the third buffer (BF3). And, in the touch driving section, by being turned on alternately the first switch (SW1) and the second switch (SW2) according to the PWM signal, a touch driving signal having an alternating form of the first touch driving voltage (VCOMH) and the second touch driving voltage (VCOML) applied to the input node (N3) of the third buffer (BF3) may be formed, and the third buffer (BF3) may amplify the touch driving signal and output the amplified touch driving signal to the third touch driving voltage output terminal (TV3).

Here, the first buffer circuit 510, the second buffer circuit 520, and the third buffer circuit 530 may distinguish the display driving section and the touch driving section according to the sync signal having the same period as the image frame.

Figure 6:
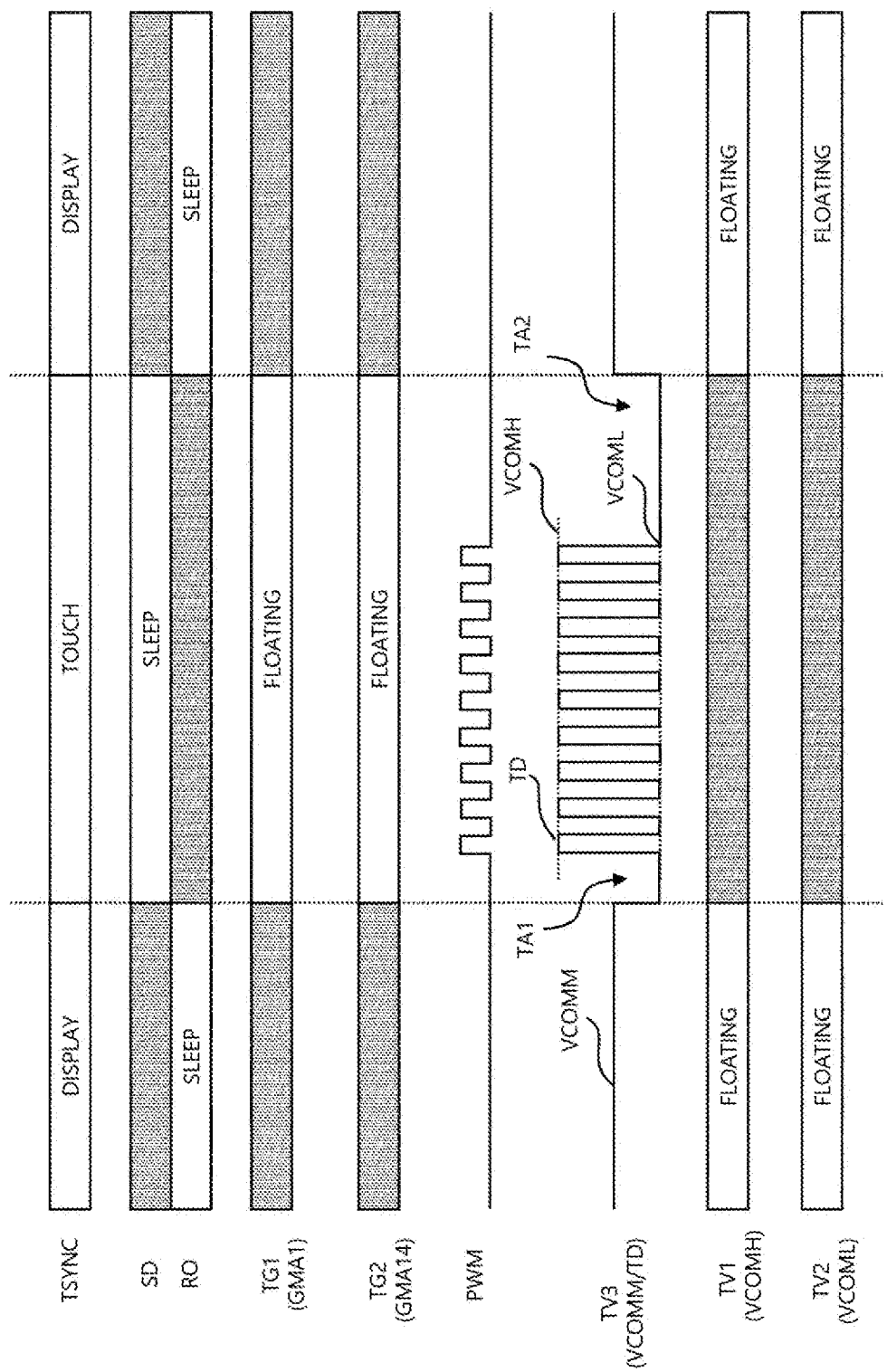
FIG. 6 is a diagram illustrating the status and output waveform of the main components of the power management device.

FIG. 6 is a diagram illustrating the status and output waveform of the main components of the power management device.

Referring to FIG. 6, the display driving section (DISPLAY) and the touch driving section (TOUCH) may be distinguished according to the sync signal (TSYNC).

In the display driving section, the circuit (SD) that generates the driving voltage necessary to generate the data voltage in the data driving device, including the gamma reference voltage supply circuit, may operate and touch sensing may be performed in the data driving device, including the touch driving voltage supply circuit. The circuit (RO) that generates the necessary driving voltage may be in a sleep state. At this time, of course, parts shared between the SD circuit and the RO circuit—for example, shared buffers—may operate.

In the touch driving section, the circuit (RO) that generates the driving voltage required for touch sensing in the data driving device, including the touch driving voltage supply circuit, may operate and generate the data voltage in the data driving device, including the gamma reference voltage supply circuit. The circuit (SD) that generates the necessary driving voltage may be in a sleep state. Through these operations, the power management device may minimize power consumption.

In the display driving section, the first gamma reference voltage output terminal (TG1) and the second gamma reference voltage output terminal (TG2) may output a first gamma reference voltage (GMA1) and a second gamma reference voltage (GMA14), respectively. Additionally, the first touch driving voltage output terminal (TV1) and the second touch driving voltage output terminal (TV2) may be floating, and the common voltage (VCOMM) may be output to the third touch driving voltage output terminal (TV3).

In the touch driving section, the first gamma reference voltage output terminal (TG1) and the second gamma reference voltage output terminal (TG2) may be floating. Additionally, the first touch driving voltage output terminal (TV1) and the second touch driving voltage output terminal (TV2) may output a first touch driving voltage (VCOMH) and a second touch driving voltage (VCOML), respectively.

In addition, a PWM signal may be formed in the touch driving section, and a touch driving signal (TD) may be generated according to the PWM signal, and the touch driving signal (TD) may be output to the third touch driving voltage output terminal (TV3).

A touch driving signal (TD) may be generated by alternating between the first touch driving voltage (VCOMH) and the second touch driving voltage (VCOML) according to the PWM signal. The touch driving signal (TD) may be generated in a certain period of time (TA1) after the transition from the display driving section to the touch driving section. Additionally, the display driving section may begin in a certain period of time (TA2) after the supply of the touch driving signal (TD) is terminated.

The shared buffers may amplify signals of different voltage levels in the display driving section and the touch driving section, respectively. In the section where the voltage level of the input signal changes, a transition phenomenon may occur in the shared buffers. To prevent this transition from affecting the touch driving voltages or gamma reference voltages, the above-mentioned certain times (TA1, TA2) may be assigned.

Figure 7A:
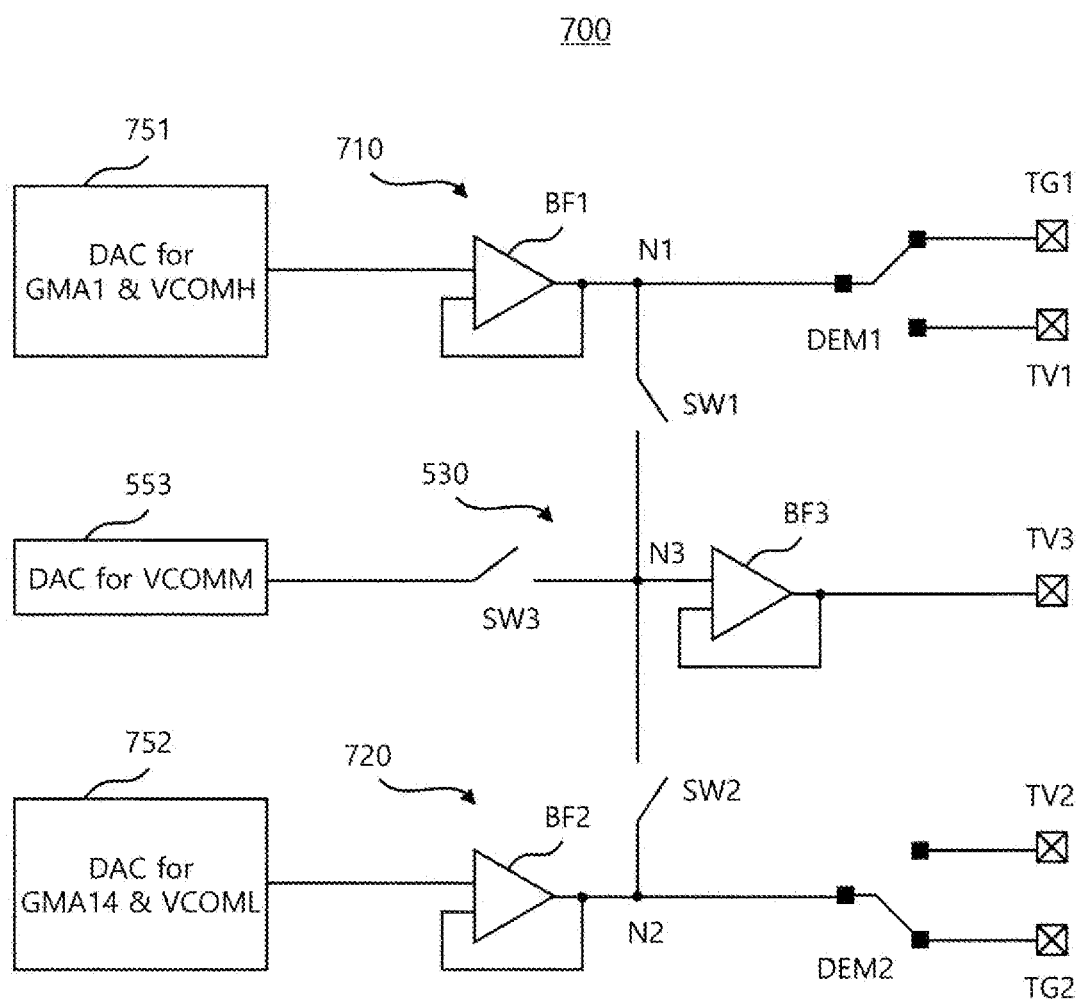
FIGS. 7A and 7B are configuration diagrams of a power management device according to a second example of an embodiment.
Figure 7B:
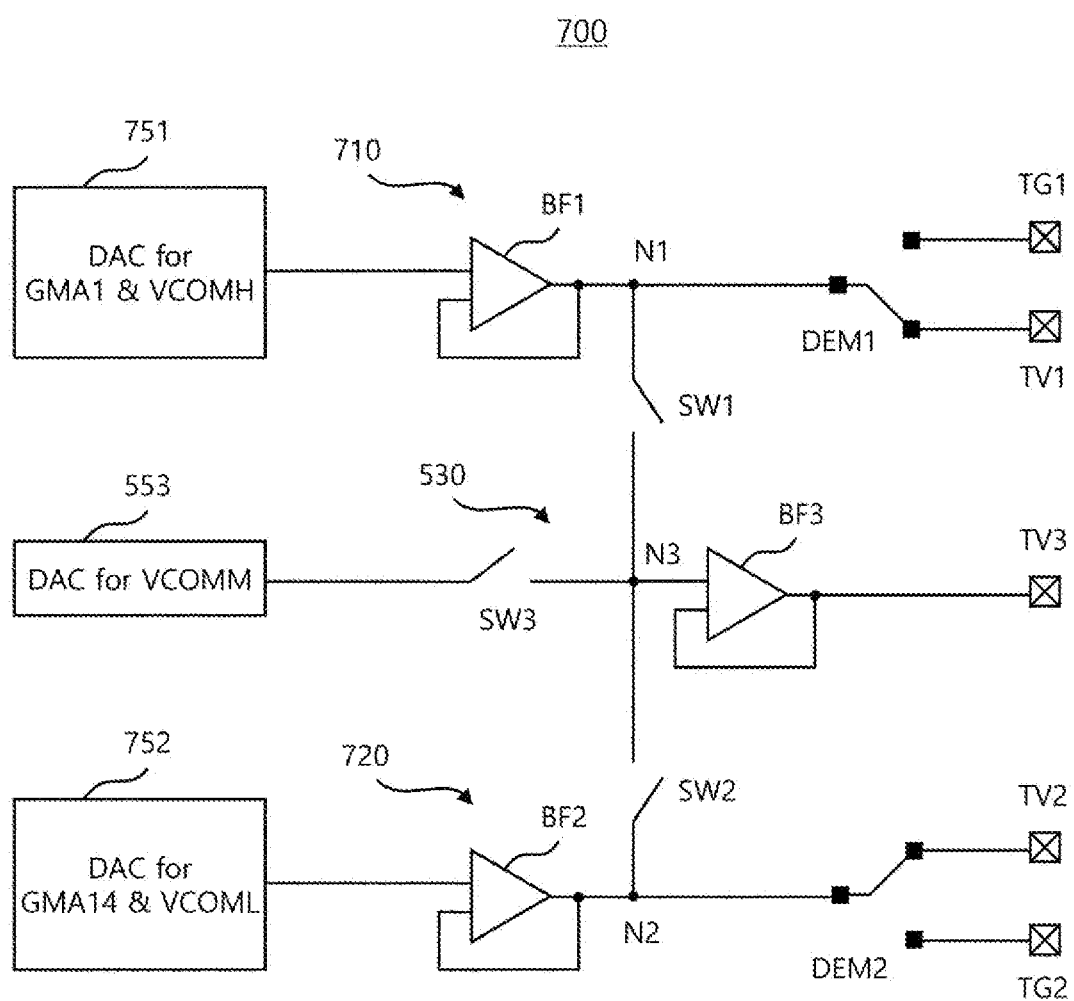

FIGS. 7A and 7B are configuration diagrams of a power management device according to a second example of an embodiment.

FIG. 7A is a diagram illustrating the connection state of the power management device in the display driving section, and FIG. 7B is a diagram illustrating the connection state of the power management device in the touch driving section.

Referring to FIGS. 7A and 7B, the power management device 700 may include a plurality of buffer circuits 710, 720, and 530.

The first buffer circuit 710 may include a first common DAC 751, a first buffer (BF1), and a first demultiplexer (DEM1).

In the display driving section, the first common DAC 751 may generate a first gamma reference voltage signal according to a digital signal corresponding to the first gamma reference voltage. Additionally, the first buffer (BF1) may generate the first gamma reference voltage (GMA1) by amplifying the first gamma reference voltage signal. And, in the display driving section, the first demultiplexer (DEM1) may output the first gamma reference voltage (GMA1) to the first gamma reference voltage output terminal (TG1) and float the first touch driving voltage output terminal (TV1).

In the touch driving section, the first common DAC 751 may generate a first touch driving voltage signal according to a digital signal corresponding to the first touch driving voltage. Additionally, the first buffer (BF1) may generate the first touch driving voltage VCOMH by amplifying the first touch driving voltage signal. And, in the touch driving section, the first demultiplexer (DEM1) may output the first touch driving voltage (VCOMH) to the first touch driving voltage output terminal (TV1) and float the first gamma reference voltage output terminal (TG1).

The second buffer circuit 720 may include a second common DAC 752, a second buffer (BF2), and a second demultiplexer (DEM2).

In the display driving section, the second common DAC 752 may generate a second gamma reference voltage signal according to a digital signal corresponding to the second gamma reference voltage. Additionally, the second buffer (BF2) may amplify the second gamma reference voltage signal to generate the second gamma reference voltage (GMA14). And, in the display driving section, the second demultiplexer (DEM2) may output the second gamma reference voltage (GMA14) to the second gamma reference voltage output terminal (TG2) and float the second touch driving voltage output terminal (TV2).

In the touch driving section, the second common DAC 752 may generate a second touch driving voltage signal according to a digital signal corresponding to the second touch driving voltage. Additionally, the second buffer (BF2) may amplify the second touch driving voltage signal to generate the second touch driving voltage (VCOML). And, in the touch driving section, the second demultiplexer (DEM2) may output the second touch driving voltage (VCOML) to the second touch driving voltage output terminal (TV2) and float the second gamma reference voltage output terminal (TG2).

The third buffer circuit 530 may include a third touch driving voltage DAC 553 and a third buffer (BF3).

In the display driving section, the third buffer (BF3) may amplify the common voltage signal output from the third touch driving voltage DAC (553) to generate a common voltage (VCOMM) and connect the common voltage (VCOMM) to the third touch driving voltage output terminal (TV3).

The third buffer circuit 530 may further include switches (SW1, SW2, and SW3). The first switch (SW1) may control the connection of the output node (N1) of the first buffer (BF1) and the input node (N3) of the third buffer (BF3). The second switch (SW2) may control the connection of the output node (N2) of the second buffer (BF2) and the input node (N3) of the third buffer (BF3). The third switch (SW3) may control the connection of the output of the third touch driving voltage DAC (553) and the input node (N3) of the third buffer (BF3).

In the display driving section, the third switch (SW3) may be turned on and the common voltage (VCOMM) may be output to the third touch driving voltage output terminal (TV3) through the third buffer (BF3). And, in the touch driving section, by being turned on alternately the first switch (SW1) and the second switch (SW2) according to the PWM signal, a touch driving signal having an alternating form of the first touch driving voltage (VCOMH) and the second touch driving voltage (VCOML) applied to the input node (N3) of the third buffer (BF3) may be formed. The third buffer (BF3) may amplify the touch driving signal and output the amplified touch driving signal to the third touch driving voltage output terminal (TV3).

In the second example, the third buffer circuit 530 may amplify the common voltage signal using the third buffer (BF3) in the display driving section and amplify the touch driving signal using the third buffer (BF3) in the touch driving section.

Figure 8A:
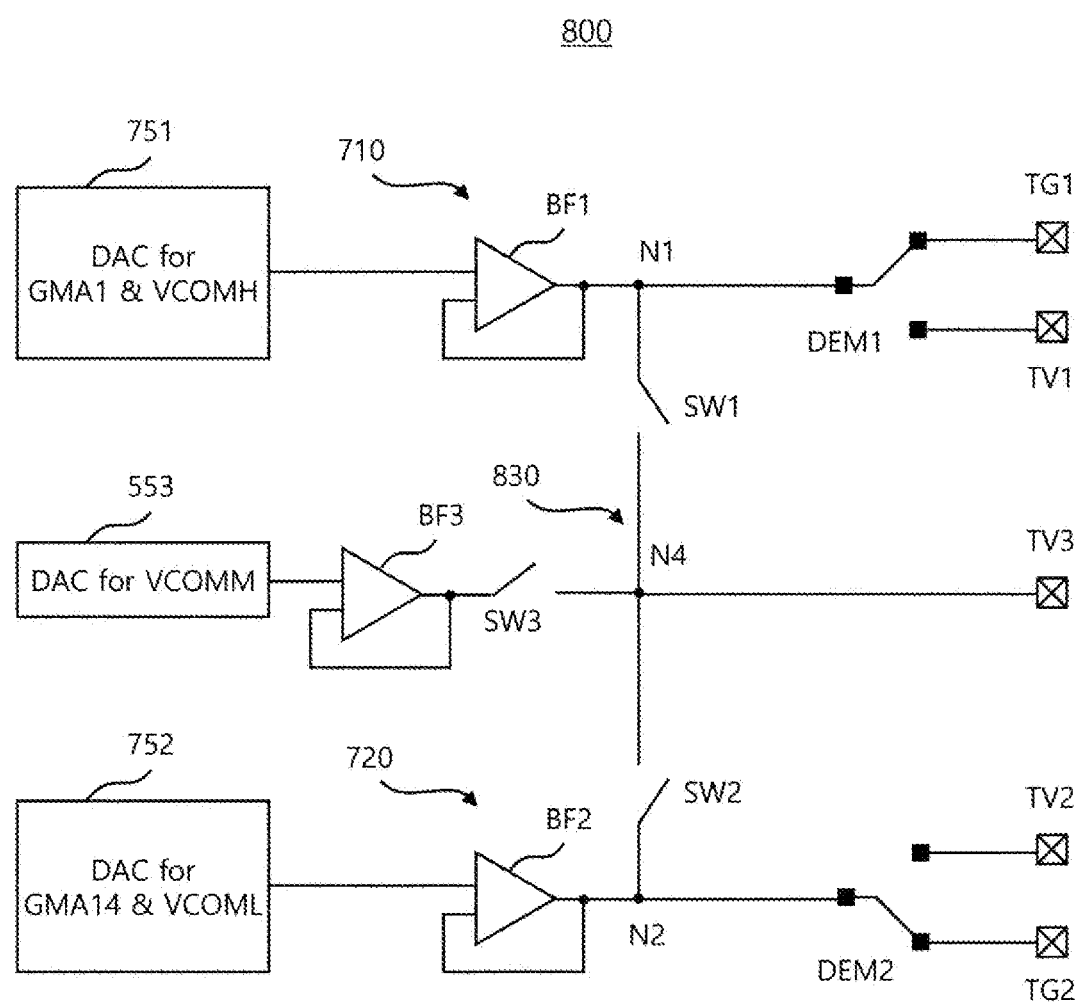
FIGS. 8A and 8B are configuration diagrams of a power management device according to a third example of an embodiment.
Figure 8B:
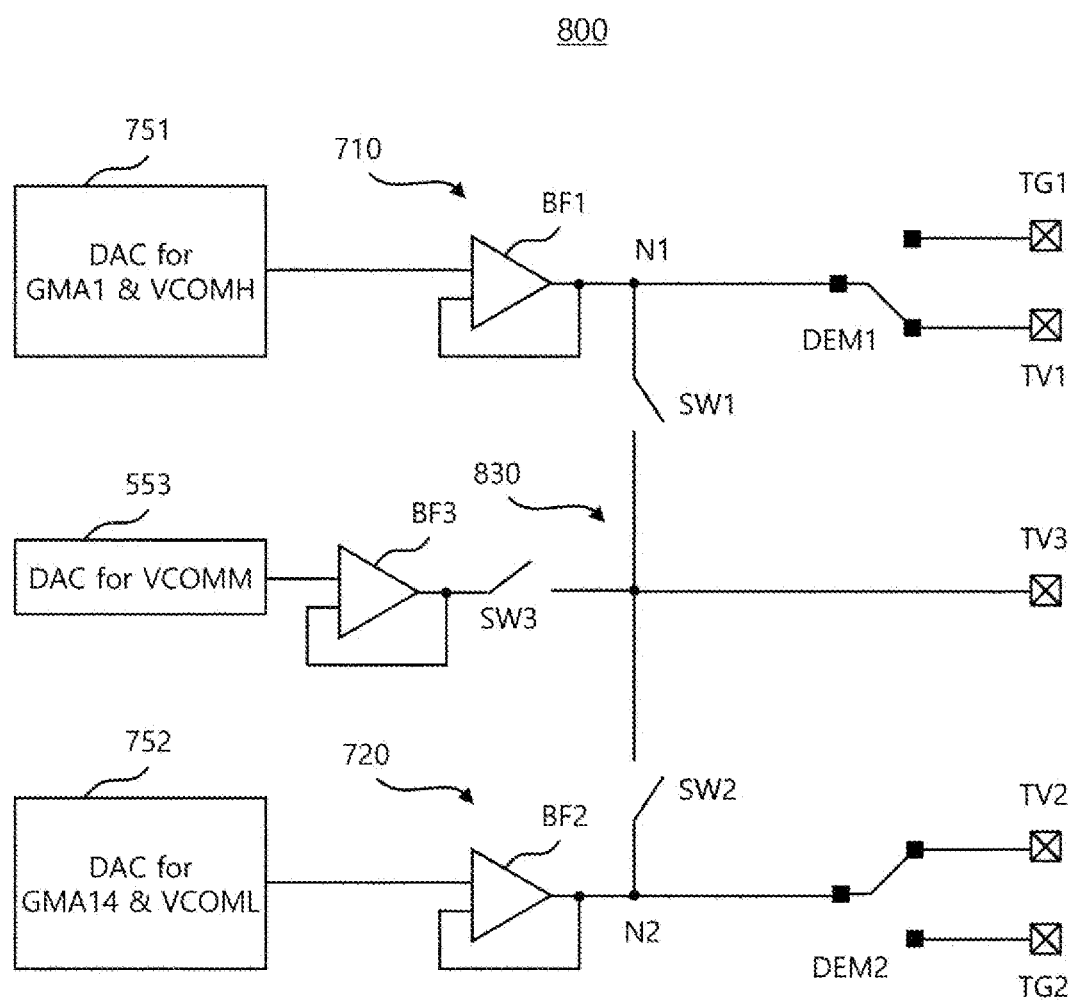

FIGS. 8A and 8B are configuration diagrams of a power management device according to a third example of an embodiment.

FIG. 8A is a diagram illustrating the connection state of the power management device in the display driving section, and FIG. 8B is a diagram illustrating the connection state of the power management device in the touch driving section.

Referring to FIGS. 8A and 8B, the power management device 800 may include a plurality of buffer circuits 710, 720, and 830.

The first buffer circuit 710 may include a first common DAC 751, a first buffer (BF1), and a first demultiplexer (DEM1).

In the display driving section, the first common DAC 751 may generate a first gamma reference voltage signal according to a digital signal corresponding to the first gamma reference voltage. Additionally, the first buffer (BF1) may amplify the first gamma reference voltage signal to generate the first gamma reference voltage (GMA1). And, in the display driving section, the first demultiplexer (DEM1) may output the first gamma reference voltage (GMA1) to the first gamma reference voltage output terminal (TG1) and float the first touch driving voltage output terminal (TV1).

In the touch driving section, the first common DAC 751 may generate a first touch driving voltage signal according to a digital signal corresponding to the first touch driving voltage. Additionally, the first buffer (BF1) may amplify the first touch driving voltage signal to generate the first touch driving voltage (VCOMH). And, in the touch driving section, the first demultiplexer (DEM1) may output the first touch driving voltage (VCOMH) to the first touch driving voltage output terminal (TV1) and float the first gamma reference voltage output terminal (TG1).

The second buffer circuit 720 may include a second common DAC 752, a second buffer (BF2), and a second demultiplexer (DEM2).

In the display driving section, the second common DAC 752 may generate a second gamma reference voltage signal according to a digital signal corresponding to the second gamma reference voltage. Additionally, the second buffer (BF2) may amplify the second gamma reference voltage signal to generate the second gamma reference voltage (GMA14). And, in the display driving section, the second demultiplexer (DEM2) may output the second gamma reference voltage (GMA14) to the second gamma reference voltage output terminal (TG2) and float the second touch driving voltage output terminal (TV2).

In the touch driving section, the second common DAC 752 may generate a second touch driving voltage signal according to a digital signal corresponding to the second touch driving voltage. Additionally, the second buffer (BF2) may amplify the second touch driving voltage signal to generate the second touch driving voltage (VCOML). And, in the touch driving section, the second demultiplexer (DEM2) may output the second touch driving voltage (VCOML) to the second touch driving voltage output terminal (TV2) and float the second gamma reference voltage output terminal (TG2).

The third buffer circuit 830 may include a third touch driving voltage DAC 553 and a third buffer (BF3).

In the display driving section, the third buffer (BF3) may amplify the common voltage signal output from the third touch driving voltage DAC 553 to generate a common voltage (VCOMM) and connect the common voltage (VCOMM) to the third touch driving voltage output terminal (TV3).

The third buffer circuit 530 may further include switches (SW1, SW2, and SW3). The first switch (SW1) may control the connection of the output node (N1) of the first buffer (BF1) and the third touch driving voltage output terminal (TV3). The second switch (SW2) may control the connection between the output node (N2) of the second buffer (BF2) and the third touch driving voltage output terminal (TV3). The third switch (SW3) may control the connection between the output node of the third buffer (BF3) and the third touch driving voltage output terminal (TV3).

In the display driving section, the third switch (SW3) may be turned on and the common voltage (VCOMM) may be output to the third touch driving voltage output terminal (TV3) through the third buffer (BF3). And, in the touch driving section, by being turned on alternately the first switch (SW1) and the second switch (SW2) according to the PWM signal, the touch driving signal having the first touch driving voltage (VCOMH) and the second touch driving voltage (VCOML) applied to the third touch driving voltage output terminal (TV3) may be formed.

In the third example, the third buffer circuit 830 may amplify the common voltage signal using the third buffer (BF3) in the display driving section, and output the touch driving signal without passing through the third buffer (BF3) in the touch driving section to the third touch driving voltage output terminal (TV3).

Figure 9:
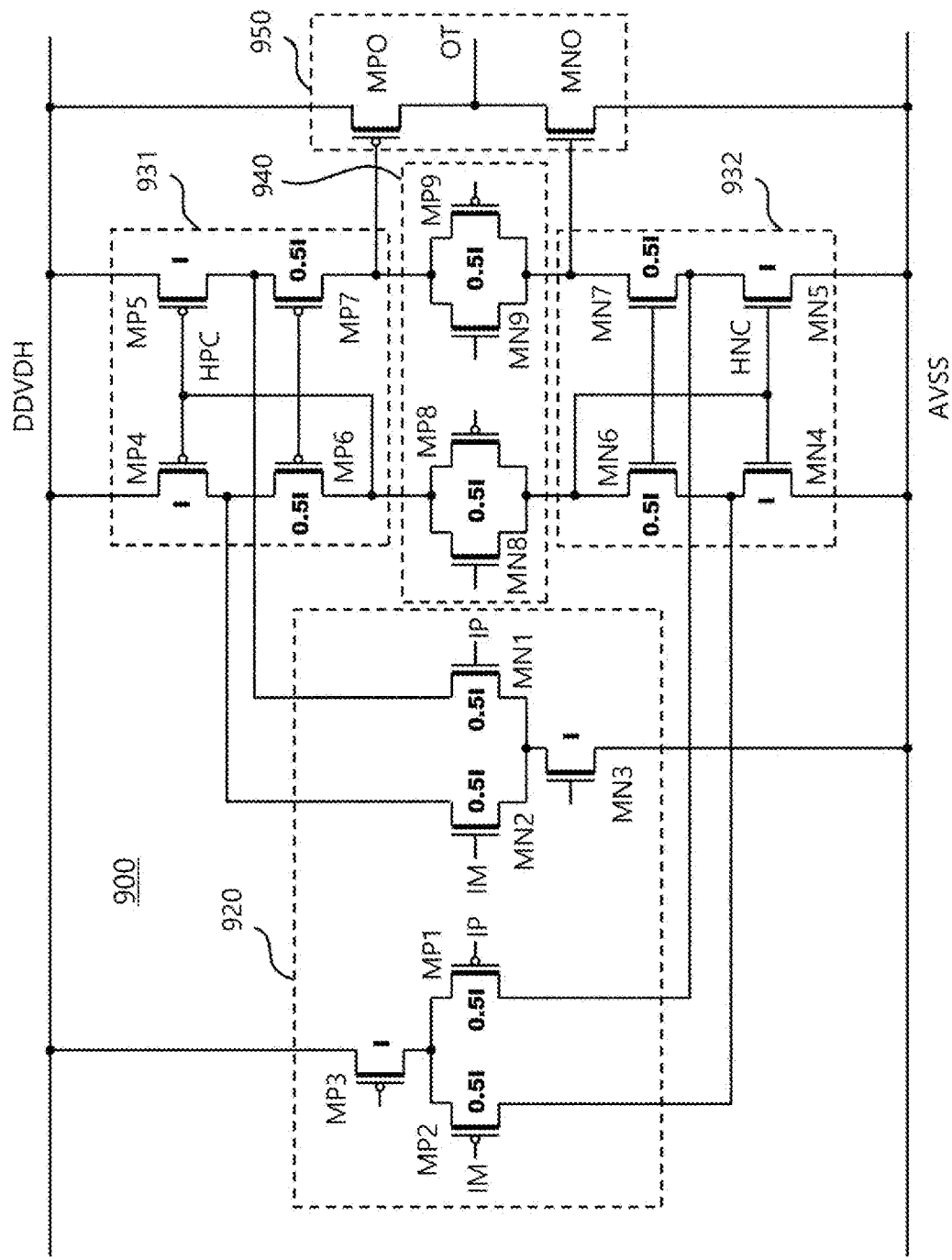
FIG. 9 is a circuit diagram of a buffer that may be applied to one embodiment.

FIG. 9 is a circuit diagram of a buffer that may be applied to one embodiment.

Referring to FIG. 9, the buffer 900 may include an input circuit stage 920, a current mirror circuit stage 931 and 932, a bias circuit stage 940, and an output circuit stage 950.

In the buffer 900, the input circuit stage 920, the current mirror circuit stage 931 and 932, the bias circuit stage 940, and the output circuit stage 950 may be configured rail-to-rail class AB amplifiers (Rail-to-Rail Class-AB amplifier).

The buffer 900 may include a first voltage rail supplied with a driving high voltage (DDVDH) and a second voltage rail supplied with a driving low voltage (AVSS). In addition, one side of the input circuit stage 920, the current mirror circuit stage 931, 932, and the output circuit stage 950 may be connected to the first voltage rail and the other side may be connected to the second voltage rail.

The buffer 900 may receive differential input voltages (IP, IM) and supply an output voltage (OT) to the outside. In the buffer 900, a first differential input voltage (IP) may be input through a first input terminal, and a second differential input voltage (IM) may be input through a second input terminal. And, the output voltage (OT) may be supplied to the outside from the buffer 900 through the output terminal. For convenience of explanation, the reference symbol 'IP' may be referred to as indicating the first differential input voltage and may be referred to as indicating the first input terminal. Additionally, the reference symbol 'IM' may be referred to as indicating the second differential input voltage and may be referred to as indicating the second input terminal. And, the reference symbol 'OT' may be referred to as indicating the output voltage and may be referred to as indicating the output terminal. And, the first differential input voltage (IP) may be referred to as a plus input voltage, and the first input terminal may be referred to as a plus (or positive) input terminal. The second differential input voltage (IM) may be referred to as a minus (or negative) input voltage, and the second input terminal may be referred to as a minus input terminal.

In the buffer 900, the minus input terminal may be connected to the output terminal. And, the output voltage (OT) may follow the waveform of the first differential input voltage (IP).

The output circuit stage 950 may include a first output transistor (MPO) disposed between the first voltage rail and the output terminal and a second output transistor (MNO) disposed between the second voltage rail and the output terminal.

The input circuit stage 920 may include a first differential amplifier circuit and a second differential amplifier circuit.

The first differential amplifier circuit may include a 1N-type transistor (MN1) and a 2N-type transistor (MN2) having a common source structure. In addition, the sources of the 1N-type transistor (MN1) and the 2N-type transistor (MN2) may be connected to the second voltage rail to which the driving low voltage (AVSS) is supplied through the 3N-type transistor (MN3).

A bias voltage may be supplied to the gate of the 3N-type transistor (MN3), and according to this bias voltage, the 3N-type transistor (MN3) may function as a bias current source.

A first differential input voltage (IP) may be supplied to the gate of the 1N-type transistor (MN1), and a second differential input voltage (IM) may be supplied to the gate of the 2N-type transistor (MN2). When the first differential input voltage (IP) and the second differential input voltage (IM) are the same, 0.5 unit current (0.5I) may flow into the 1N type transistor (MN1). 0.5 unit current (0.5I) may flow into the 2N type transistor (MN2).

When the first differential input voltage (IP) increases, more current may flow to the 1N type transistor (MN1). When more current flows to the 1N type transistor (MN1), more current flows to the first output transistor (MPO). As less current flows to the second output transistor (MNO), the output voltage (OT) may increase. And, when the first differential input voltage (IP) falls, less current may flow to the 1N-type transistor (MN1). If less current flows to the 1N-type transistor (MN1), less current may flow to the first output transistor (MPO). As current flows and more current flows to the second output transistor (MNO), the output voltage (OT) may decrease.

The second differential amplifier circuit may include a first P-type transistor (MP1) and a second P-type transistor (MP2) having a common source structure. Additionally, the sources of the 1st P-type transistor (MP1) and the 2nd P-type transistor (MP2) may be connected to the first voltage rail to which the driving high voltage (DDVDH) is supplied through the 3rd P-type transistor (MP3).

A bias voltage may be supplied to the gate of the 3P-type transistor (MP3), and according to this bias voltage, the 3P-type transistor (MP3) may function as a bias current source.

A first differential input voltage (IP) may be supplied to the gate of the 1P-type transistor (MP1), and a second differential input voltage (IM) may be supplied to the gate of the 2P-type transistor (MP2). When the first differential input voltage (IP) and the second differential input voltage (IM) are the same, 0.5 unit current (0.5I) may flow through the first P-type transistor (MP1) and into the second P-type transistor (MP2). 0.5 unit current (0.5I) may flow.

When the first differential input voltage (IP) increases, less current may flow to the first P-type transistor (MP1). If less current flows to the first P-type transistor (MP1), more current flows to the first output transistor (MPO). As less current flows to the second output transistor (MNO), the output voltage (OT) may increase. And, when the first differential input voltage (IP) falls, more current may flow to the 1st P-type transistor (MP1). When more current flows to the 1st P-type transistor (MP1), less current flows to the first output transistor (MPO). As current flows and more current flows to the second output transistor (MNO), the output voltage (OT) may decrease.

The current mirror circuit stages 931 and 932 may include a first current mirror circuit 931 and a second current mirror circuit 932.

The first current mirror circuit 931 may include a first reference current transistor (MP4) and a first mirroring current transistor (MP5).

The first current mirror circuit 931 may have a common gate structure. The gate of the first reference current transistor (MP4) may be connected to the gate of the first mirroring current transistor (MP5).

One side of the first current mirror circuit 931 may be connected to the first voltage rail to which the driving high voltage (DDVDH) is supplied. The source of the first reference current transistor (MP4) and the source of the first mirroring current transistor MP5 may be connected to the first voltage rail.

A first reference current may flow through the first reference current transistor (MP4), and a mirroring current for the first reference current may flow through the first mirroring current transistor (MP5).

A first additional transistor circuit having a common gate structure may be disposed on the drain of the first reference current transistor (MP4) and the drain of the first mirroring current transistor (MP5).

The first additional transistor circuit may include a first additional transistor (MP6) connected to the drain of the first reference current transistor (MP4) and a second additional transistor (MP7) connected to the drain of the first mirroring current transistor (MP5). The first additional transistor (MP6) may perform additional functions such as limiting the amount of current flowing to the first reference current transistor (MP4), and the second additional transistor (MP7) may perform additional functions such as limiting the amount of current flowing to the first mirroring current transistor (MP5).

To configure a current mirror circuit, the gate and drain of the first reference current transistor (MP4) may be electrically connected. In a normal operation, the first additional transistor (MP6) and the second additional transistor (MP7) may operate as a bypass circuit, so that the gate of the first reference current transistor (MP4) and the drain of the first additional transistor (MP6) may be connected.

In the first differential amplifier circuit of the input circuit stage 920, the drain of the first N-type transistor (MN1) may be connected to the drain of the first mirroring current transistor (MP5). And, in the first differential amplifier circuit, the drain of the 2N type transistor (MN2) may be connected to the drain of the first reference current transistor (MP4).

The second current mirror circuit 932 may include a second reference current transistor (MN4) and a second mirroring current transistor (MN5).

The second current mirror circuit 932 may have a common gate structure. The gate of the second reference current transistor (MN4) may be connected to the gate of the second mirroring current transistor (MN5).

One side of the second current mirror circuit 932 may be connected to a second voltage rail to which the driving low voltage (AVSS) is supplied. The source of the second reference current transistor (MN4) and the source of the second mirroring current transistor (MN5) may be connected to the second voltage rail.

A second reference current may flow through the second reference current transistor (MN4), and a mirroring current for the second reference current may flow through the second mirroring current transistor (MN5).

A second additional transistor circuit having a common gate structure may be disposed on the drain of the second reference current transistor (MN4) and the drain of the second mirroring current transistor (MN5).

The second additional transistor circuit may include a third additional transistor (MN6) connected to the drain of the second reference current transistor (MN4) and a fourth additional transistor (MN7) connected to the drain of the second mirroring current transistor (MN5). The third additional transistor (MN6) may perform additional functions such as limiting the amount of current flowing to the second reference current transistor (MN4), and the fourth additional transistor (MN7) may perform additional functions such as limiting the amount of current flowing to the second mirroring current transistor (MN5).

To configure a current mirror circuit, the gate and drain of the second reference current transistor (MN4) may be electrically connected. In a normal operation, the third additional transistor (MN6) and the fourth additional transistor (MN7) may operate as a bypass circuit, so that the gate of the second reference current transistor (MN4) and the drain of the third additional transistor (MN6) may be connected to each other.

In the second differential amplifier circuit of the input circuit stage 920, the drain of the first P-type transistor (MP1) may be connected to the drain of the second mirroring current transistor (MN5). And, in the second differential amplifier circuit, the drain of the 2P type transistor (MP2) may be connected to the drain of the second reference current transistor (MN4).

A bias circuit stage 940 may be disposed between the first current mirror circuit 931 and the second current mirror circuit 932.

The bias circuit stage 940 may include a first bias circuit and a second bias circuit.

The first bias circuit may have a structure in which one N-type transistor (MN8) and one P-type transistor (MP8) may be connected in parallel. The bias current supplied by the first bias circuit may be determined according to the bias voltage supplied to the gate of one N-type transistor (MN8) and one P-type transistor (MP8).

The second bias circuit may have a structure in which another N-type transistor (MN9) and another P-type transistor (MP9) may be connected in parallel. The bias current supplied by the second bias circuit may be determined according to the bias voltage supplied to the gate of one N-type transistor (MN9) and another P-type transistor (MP9).

The first bias circuit is electrically connected to the first reference current transistor (MP4) of the first current mirror circuit (931) and the second reference current transistor (MN4) of the second current mirror circuit (932) to generate one current. A path may be formed. This path may be referred to as the reference current path. In the reference current path, the first bias current formed by the first bias circuit basically passes through the first voltage rail, the first reference current transistor (MP4), the first bias circuit, and the second reference current transistor (MN4), and may flow out to the voltage rail.

The second bias circuit is electrically connected to the first mirroring current transistor (MP5) of the first current mirror circuit 931 and the second mirroring current transistor (MN5) of the second current mirror circuit 932 and a current path may be formed. This path may be referred to as a mirroring current path. In the mirroring current path, the second bias current formed by the second bias circuit may basically pass through the first voltage rail, the first mirroring current transistor (MP5), and the second bias circuit, and then passes through the second mirroring current transistor (MN5) and may flow out to the voltage rail.

In the output circuit stage 950, the source of the first output transistor (MPO) may be connected to the first voltage rail and the drain may be connected to the output stage (OT). And, the gate of the first output transistor (MPO) may be connected to the contact node of the second bias circuit and the first current mirror circuit 931 in the mirroring current path.

In the output circuit stage 950, the source of the second output transistor (MNO) may be connected to the second voltage rail and the drain may be connected to the output stage (OT). And, the gate of the second output transistor (MNO) may be connected to the contact node of the second bias circuit and the second current mirror circuit 932 in the mirroring current path.

The input circuit stage 920 may generate differential currents according to the differential input voltages (IP, IM). Additionally, the current mirror circuit stages 931 and 932 may control the gate voltages of the first output transistor (MPO) and the second output transistor (MNO) according to the differential currents.

Since the bias voltage is constantly supplied to these buffers, power may be consumed even when the buffer is not operating due to the bias voltage. The power management device according to one embodiment shares the buffer so that the buffer may be operated in all time periods and minimizes unnecessary consumption of bias power.

As described above, according to the embodiment, the display device may be miniaturized and reduce power consumption. And, according to the embodiment, the power management device included in the display device may be miniaturized and reduce power consumption. And, according to the embodiment, it is possible to satisfy the required voltage characteristics while reducing the number of additional circuits such as buffers in the power management device.

What is claimed is:

1. A power management device of operating a display panel, comprising:
    a first buffer circuit configured to generate and output a first gamma reference voltage in a first section of a frame, and generate and output a first touch driving voltage in a second section of the frame; and
    a second buffer circuit configured to generate and output a second gamma reference voltage in the first section, and generate and output a second touch driving voltage in the second section.

2. The power management device of claim 1, wherein the first buffer circuit includes a first buffer configured to amplify and output an input signal, a first multiplexer configured to selectively transmit one of a first gamma reference voltage signal for generating the first gamma reference voltage and a touch driving voltage signal for generating the first touch driving voltage as the input signal of the first buffer, and
    wherein the second buffer circuit includes a second buffer configured to amplify and output an input signal, a second multiplexer configured to selectively transmit one of a second gamma reference voltage signal for generating the second gamma reference voltage and a touch driving voltage signal for generating the second touch driving voltage as the input signal of the second buffer.

3. The power management device of claim 2, wherein the first buffer circuit includes a first demultipexer configured to selectively supply an output voltage of the first buffer to one of the first gamma reference voltage output terminal and the first touch driving voltage output terminal, and
wherein the second buffer circuit includes a second demultipexer configured to selectively supply an output voltage of the second buffer to one of the second gamma reference voltage output terminal and the second touch driving voltage output terminal.

4. The power management device of claim 1, further comprising at least one of a first switch and a second switch,
wherein the first switch is configured to output the first touch driving voltage to a third touch driving voltage output terminal in response to a Pulse Width Modulation, PWM, signal in the second section, and
wherein the second switch is configured to alternately output the first touch driving voltage and the second touch driving voltage to the third touch driving voltage output terminal in response to an inversion signal of the PWM signal.

5. The power management device of claim 4, further comprising a third switch, wherein the third switch is turned on in the first section and is configured to output a common voltage for driving a common electrode to the third touch driving voltage output terminal in the first section.

6. The power management device of claim 5, further comprising a third buffer,
wherein the third buffer is configured to amplify a common voltage signal in the first section to generate the common voltage, and amplify and output the first touch driving voltage and the second touch driving voltage in the second section to the third touch driving voltage output terminal.

7. The power management device of claim 6, further comprising at least one of:
a first Digital-to-Analog-Converter, DAC, configured to generate a first touch driving voltage signal,
a second DAC configured to generate a second touch driving voltage signal,
a third DAC configured to generate the common voltage signal,
a fourth DAC configured to generate a first gamma reference voltage signal, and
a fifth DAC configured to generate a second gamma reference voltage signal.

8. The power management device of claim 1, wherein the first buffer circuit includes a first Digital-to-Analog-Converter, DAC, configured to generate a first touch driving voltage signal and a first gamma reference voltage signal, and
wherein the second buffer circuit includes a second DAC configured to generate a second touch driving voltage signal and a second gamma reference voltage signal.

9. The power management device of claim 8, further comprising a third buffer circuit,
wherein the third buffer circuit is configured to amplify a common voltage signal to generate a common voltage and output the generated common voltage in the first section, and
wherein the third buffer circuit is configured to output a touch driving signal that alternately has the first touch driving voltage and the second touch driving voltage in the second section.

10. The power management device of claim 9, wherein the third buffer circuit includes a third buffer, and
wherein the third buffer circuit is configured to amplify the common voltage signal using the third buffer in the first section, and amplify the touch driving signal using the third buffer in the second section.

11. The power management device of claim 9, wherein the third buffer circuit includes a third buffer, and
wherein the third buffer circuit is configured to amplify the common voltage signal using the third buffer in the first section, and output the touch driving signal without passing through the third buffer in the second section.

12. The power management device of claim 1, wherein the first gamma reference voltage is a voltage having the highest voltage level among gamma reference voltages, and the second gamma reference voltage is a voltage having the lowest voltage level among gamma reference voltages, and
wherein a voltage level of the first touch driving voltage is higher than that of the second touch driving voltage.

13. The power management device of claim 1, wherein the first buffer circuit and the second buffer circuit are configured to distinguish the first section and the second section according to a sync signal having a period that is same as a period of an image frame.

14. A display device including a power management device of operating a display panel, comprising:
a first circuit configured to generate a gamma reference voltage for a gamma voltage using buffers, output the gamma reference voltage to gamma reference voltage output nodes in a first section of a frame, and float the gamma reference voltage output nodes in a second section of the frame; and
a second circuit configured to share portion of the buffers, generate a touch driving voltage for a touch driving, output the touch driving voltage to touch driving voltage output nodes in the second section, and float the touch driving voltage output nodes in the first section.

15. The display device of claim 14, wherein a plurality of nodes is formed in a resistor string, and gamma reference voltages formed in the plurality of nodes are transmitted to some nodes of the resistor string in which gamma voltages are formed.

16. The display device of claim 15, further comprising a data driving device for driving a pixel, and
wherein the data driving device is configured to convert a gray level value for the pixel into a data voltage for driving the pixel using the gamma voltages in a digital-to-analog converter.

17. The display device of claim 14, wherein a touch driving signal for driving a touch electrode has a form in which a first touch driving voltage and a second touch driving voltage alternate among touch driving voltages.

18. The display device of claim 17, wherein the touch driving signal is generated as the first touch drive voltage and the second touch drive voltage alternate according to a Pulse Width Modulation, PWM, signal, and
wherein the touch driving signal is generated in a predefined time after converting from the first section to the second section.

19. The display device of claim 17, wherein a first gamma reference voltage having the highest voltage level among gamma reference voltages and the first touch driving voltage share a first buffer, and wherein a second gamma reference voltage having the lowest voltage level among the gamma reference voltages and the second touch driving voltage share a second buffer.

20. The display device of claim 14, wherein a bias voltage is continuously supplied to the buffers, and power is consumed in the buffers by the bias voltage.

* * * * *